(12) United States Patent
Inoue et al.

(10) Patent No.: US 8,751,767 B2
(45) Date of Patent: Jun. 10, 2014

(54) COMPUTER SYSTEM AND ITS CONTROL METHOD

(75) Inventors: Hironobu Inoue, Odawara (JP); Shintaro Inoue, Odawara (JP); Yutaka Takata, Ninomiya (JP)

(73) Assignee: Hitachi, Ltd., Tokyo (JP)

(*) Notice: Subject to any disclaimer, the term of this patent is extended or adjusted under 35 U.S.C. 154(b) by 637 days.

(21) Appl. No.: 12/594,226

(22) PCT Filed: Apr. 23, 2009

(86) PCT No.: PCT/JP2009/058593
§ 371 (c)(1),
(2), (4) Date: Oct. 1, 2009

(87) PCT Pub. No.: WO2010/122679
PCT Pub. Date: Oct. 28, 2010

(65) Prior Publication Data
US 2011/0185139 A1    Jul. 28, 2011

(51) Int. Cl.
*G06F 12/00* (2006.01)
(52) U.S. Cl.
USPC ............................ 711/170; 711/112; 711/114
(58) Field of Classification Search
None
See application file for complete search history.

(56) References Cited

U.S. PATENT DOCUMENTS

| | | | |
|---|---|---|---|
| 5,987,569 | A | 11/1999 | Takahashi et al. |
| 7,730,259 | B2 | 6/2010 | Taguchi et al. |
| 2002/0152357 | A1 | 10/2002 | Takahashi et al. |
| 2003/0046491 | A1 | 3/2003 | Katsurashima |
| 2005/0015547 | A1* | 1/2005 | Yokohata et al. ............. 711/114 |
| 2005/0262038 | A1 | 11/2005 | Sepez et al. |
| 2006/0020691 | A1* | 1/2006 | Patterson et al. ............. 709/223 |
| 2006/0064541 | A1* | 3/2006 | Kano ............................. 711/114 |
| 2006/0224844 | A1* | 10/2006 | Kano et al. .................... 711/162 |
| 2006/0236049 | A1 | 10/2006 | Iwamura |
| 2006/0277386 | A1 | 12/2006 | Eguchi |
| 2007/0055704 | A1 | 3/2007 | Watanabe et al. |
| 2007/0078961 | A1 | 4/2007 | Kumano et al. |
| 2007/0118689 | A1 | 5/2007 | Hyde, II et al. |
| 2007/0168565 | A1 | 7/2007 | Yuhara et al. |
| 2008/0010422 | A1 | 1/2008 | Suzuki et al. |
| 2008/0162810 | A1 | 7/2008 | Taguchi et al. |
| 2008/0235448 | A1 | 9/2008 | Inoue et al. |
| 2009/0037656 | A1 | 2/2009 | Suetsugu et al. |

(Continued)

FOREIGN PATENT DOCUMENTS

JP    1-191221 A    8/1989
JP    4-38540 A     2/1992

(Continued)

OTHER PUBLICATIONS

Chinese Office Action received in Chinese Application No. 200980157683.9 dated Mar. 5, 2014.

*Primary Examiner* — Matthew Bradley
*Assistant Examiner* — Alan Otto
(74) *Attorney, Agent, or Firm* — Mattingly & Malur, PC

(57) ABSTRACT

This invention intends to provide the computer system equalizing the storage capacity immediately and appropriately to multiple real logical areas dynamically providing storage capacity to virtual logical areas. This invention is the computer system which, in the process of performing the dynamic allocation of storage areas to virtual volumes in response to accesses from the higher-level device, when adding pool volumes to the pool, migrates storage areas among multiple logical areas, and maintains the balance of the storage capacity.

7 Claims, 38 Drawing Sheets

(56) References Cited

U.S. PATENT DOCUMENTS

| | | |
|---|---|---|
| 2009/0043982 A1 | 2/2009 | Kano et al. |
| 2009/0055593 A1 | 2/2009 | Satoyama et al. |
| 2009/0055613 A1 | 2/2009 | Maki et al. |

FOREIGN PATENT DOCUMENTS

| | | |
|---|---|---|
| JP | 06-119125 A | 4/1994 |
| JP | 6-187227 A | 7/1994 |
| JP | 8-221326 A | 8/1996 |
| JP | 2003-005920 A | 1/2003 |
| JP | 2003-15915 A | 1/2003 |
| JP | 2003-186712 A | 7/2003 |
| JP | 2003-186713 A | 7/2003 |
| JP | 2006-293850 A | 10/2006 |
| JP | 2006-338341 A | 12/2006 |
| JP | 2007-72519 A | 3/2007 |
| JP | 2007-079885 A | 3/2007 |
| JP | 2007-179156 A | 7/2007 |
| JP | 2008-015768 A | 1/2008 |
| JP | 2008-165620 A | 7/2008 |
| JP | 2008-234158 A | 10/2008 |
| JP | 2008-269636 A | 11/2008 |
| JP | 2009-37304 A | 2/2009 |
| JP | 2009-048497 A | 3/2009 |
| JP | 2009-048514 A | 3/2009 |

\* cited by examiner

FIG.17A

POOL MANAGEMENT TABLE

| POOL # | CAPACITY NUMBER OF PAGES | USAGE AMOUNT NUMBER OF PAGES | AFFILIATED POOL VOL NUMBER |
|---|---|---|---|
| | | | |

FIG.17B

POOL VOL MANAGEMENT TABLE

| POOL # | CAPACITY NUMBER OF PAGES | USAGE AMOUNT NUMBER OF PAGES | AFFILIATED POOL VOL NUMBER |
|---|---|---|---|
| | | | |

FIG.17C

FREE QUEUE UNIT MANAGEMENT TABLE

| FREE QUEUE # | POOL VOL # MANAGED BY FREE QUEUE | NUMBER OF POOL VOLUMES LINKED TO FREE QUEUE | AFFILIATED POOL # |
|---|---|---|---|
| | | | |

ALLOCATION ORDER MANAGEMENT TABLE

| FREE QUEUE # | ALLOCATION RATIO | ALLOCATION COUNT | |
|---|---|---|---|
| 0 | 2 | 2 | |
| 1 | 3 | 2 |  COUNTER |
| 2 | 2 | 0 | |

FIG.23

| HDP VOL # | POOL VOL # | | | |
|---|---|---|---|---|
| | 0 | 1 | 2 | 3 |
| 0 | 1 | 1 | 1 | 0 |
| 1 | 0 ←1 PAGE← 2 | | 0 ←2 PAGES← 2 | |
| 2 | 2 →1 PAGE→ 0 | | 2 | 0 |

POOL VOL CAPACITY RATIO 1 : 1 : 2 : 1

FIG.24

| HDP #0 POOL VOLs | | |
|---|---|---|
| POOL VOL # | NUMBER OF MIGRATED PAGES | MIGRATION SOURCE OR DESTINATION? |
| 0 | 0 | — |
| 1 | 0 | — |
| 2 | 0 | — |
| 3 | 0 | — |

| HDP #1 POOL VOLs, AMOUNT OF MIGRATION | | |
|---|---|---|
| POOL VOL # | NUMBER OF MIGRATED PAGES | MIGRATION SOURCE OR DESTINATION? |
| 0 | 1 | MIGRATION DESTINATION |
| 1 | 1 | MIGRATION SOURCE |
| 2 | 2 | MIGRATION DESTINATION |
| 3 | 2 | MIGRATION SOURCE |

| HDP #2 POOL VOLs, AMOUNT OF MIGRATION | | |
|---|---|---|
| POOL VOL # | NUMBER OF MIGRATED PAGES | MIGRATION SOURCE OR DESTINATION? |
| 0 | 1 | MIGRATION SOURCE |
| 1 | 1 | MIGRATION DESTINATION |
| 2 | 0 | — |
| 3 | 0 | — |

FIG.37A

| PoolGroup#0 | PoolVol#0 | PoolVol#1 | PoolVol#2 | PoolVol#3 |
|---|---|---|---|---|
| CAPACITY | 300 | 100 | 200 | 200 |
| USAGE AMOUNT | 60 | 15 | 40 | 5 |
| REMAINING CAPACITY | 240 | 85 | 160 | 195 |

FIG.37B

| PoolGroup#0 | PoolVol#0 | PoolVol#1 | PoolVol#2 | PoolVol#3 |
|---|---|---|---|---|
| CAPACITY | 300 | 100 | 200 | 200 |
| USAGE AMOUNT | 60 | 15 | 35 | 10 |
| REMAINING CAPACITY | 240 | 85 | 165 | 190 |

FIG.37C

| PoolGroup#0 | PoolVol#0 | PoolVol#1 | PoolVol#2 | PoolVol#3 |
|---|---|---|---|---|
| CAPACITY | 300 | 100 | 200 | 200 |
| USAGE AMOUNT | 60 | 15 | 30 | 15 |
| REMAINING CAPACITY | 240 | 85 | 170 | 185 |

FIG.37D

| PoolGroup#0 | PoolVol#0 | PoolVol#1 | PoolVol#2 | PoolVol#3 |
|---|---|---|---|---|
| CAPACITY | 300 | 100 | 200 | 200 |
| USAGE AMOUNT | 55 | 15 | 30 | 20 |
| REMAINING CAPACITY | 245 | 85 | 170 | 180 |

FIG.37E

| PoolGroup#0 | PoolVol#0 | PoolVol#1 | PoolVol#2 | PoolVol#3 |
|---|---|---|---|---|
| CAPACITY | 300 | 100 | 200 | 200 |
| USAGE AMOUNT | 50 | 15 | 30 | 25 |
| REMAINING CAPACITY | 250 | 85 | 170 | 175 |

FIG.37F

| PoolGroup#0 | PoolVol#0 | PoolVol#1 | PoolVol#2 | PoolVol#3 |
|---|---|---|---|---|
| CAPACITY | 300 | 100 | 200 | 200 |
| USAGE AMOUNT | 45 | 15 | 30 | 30 |
| REMAINING CAPACITY | 255 | 85 | 170 | 170 |

FIG.38A

|  | PoolVol#0 | PoolVol#1 | PoolVol#2 | PoolVol#3 | USAGE AMOUNT IN HDP-VOL |
|---|---|---|---|---|---|
| HDP-VOL#0 | 20 | 0 | 10 | 5 | 35 |
| HDP-VOL#1 | 10 | 5 | 15 | 0 | 30 |
| HDP-VOL#2 | 30 | 10 | 15 | 0 | 55 |
| USAGE AMOUNT IN POOL VOL | 60 | 15 | 40 | 5 | 120 |

FIG.38B

|  | PoolVol#0 | PoolVol#1 | PoolVol#2 | PoolVol#3 | USAGE AMOUNT IN HDP-VOL |
|---|---|---|---|---|---|
| HDP-VOL#0 | 15 | 0 | 10 | 10 | 35 |
| HDP-VOL#1 | 5 | 5 | 10 | 10 | 30 |
| HDP-VOL#2 | 25 | 10 | 10 | 10 | 55 |
| USAGE AMOUNT IN POOL VOL | 45 | 15 | 30 | 30 | 120 |

COMPUTER SYSTEM AND ITS CONTROL METHOD

TECHNICAL FIELD

This invention relates to a computer system, specifically to a computer system which dynamically allocates storage capacity to host devices.

BACKGROUND ART

Conventionally, a computer system providing a large-scale data storage service to the host devices exists. This system is known to include host devices, a storage apparatus to which the host devices are connected, and a management device of the storage apparatus.

The storage apparatus manages multiple hard disks by the RAID (Redundant Array of Independent/Inexpensive Disks) method. The storage apparatus logicalizes physical storage areas included in multiple hard disks and provides them as logical volumes to the host devices. The host devices access the logical volumes and request reading and writing of data.

One of the logicalization technologies of this type is called thin provisioning. The storage apparatus sets a virtual volume, which does not include any physical storage areas, for the host devices. As the host devices make write accesses to the virtual volume, the storage apparatus sequentially allocates storage areas to the virtual volume.

Therefore, this technology is more effective, compared with the method of allocating a large capacity storage area to logical volumes from the beginning, in that storage resources can be efficiently utilized. This technology is disclosed in Japanese Patent Application No. 2003-015915A and Japanese Unexamined Patent Application Publication No. 2006-338341A.

The means for providing storage areas to the virtual volume consists of a logical group, called a pool, of multiple logical volumes to each of which physical storage areas are allocated. Each of the multiple logical volumes is called a pool volume. If there is a write access from the host device to the virtual volume, the storage area in the corresponding area of the pool volume is allocated to the access destination of the virtual volume.

The storage apparatus can store write data from the host device by making the area accessed by the host device for the virtual volume correspond with the area in the pool volume to which the storage capacity is allocated.

Though the storage apparatus intends to allocate storage areas to the multiple pool volumes equally, with the passage of time, the problem arises that this equality is impaired. Therefore, Japanese Patent Application No. 2008-234158A discloses that, by migrating storage areas among multiple pool volumes, the storage area capacity becomes equal among the multiple pool volumes.

CITATION LIST

Patent Literature (PTL)

PTL 1 Japanese Patent Application No. 2003-015915A
PTL2 Japanese Patent Application No. 2006-338341 A
PTL 3 Japanese Patent Application No. 2008-234158A

SUMMARY OF INVENTION

Technical Problem

Japanese Patent Publication No. 2008-234158, though disclosing that storage areas are migrated by the external operation, did not go far enough to propose the immediate and reliable equalization of storage capacity among multiple pool volumes.

Therefore, an object of this invention is to provide a computer system and its control method capable of performing the immediate and reliable equalization of storage capacity to multiple real logical areas that dynamically provides storage capacity to virtual logical areas.

Solution to Problem

In order to achieve the foregoing object, this invention provides a computer system and its control method which migrate a storage area among a plurality of pool volumes so as to maintain the balance of the storage capacity when a pool volume is added to a pool during the course of executing an operation of dynamically allocating a storage area to a virtual volume in response to an access from a host system.

Effects of Invention

This invention can provide the computer system and control methods for the same performing the immediate and reliable equalization of storage capacity to multiple real logical areas that dynamically provides storage capacity to virtual logical areas.

BRIEF DESCRIPTION OF DRAWINGS

FIG. 17A is a table for managing a pool, FIG. 17B is a table for managing a pool volume, and FIG. 17C is a table for managing a free queue unit;

FIG. 23 is a block diagram of a virtual volume and pool volumes showing the calculated number of pages and the process of page migration;

FIG. 24 is a management table for achieving the migration embodiment shown in FIG. 23;

FIG. 37A to FIG. 37F are migration progress management screens in which the page usage status is aggregated in units of pool volumes; and FIG. 38A and FIG. 38B are screens in which the number of pages is aggregated in units of virtual volumes.

DESCRIPTION OF EMBODIMENT

Figure 1:
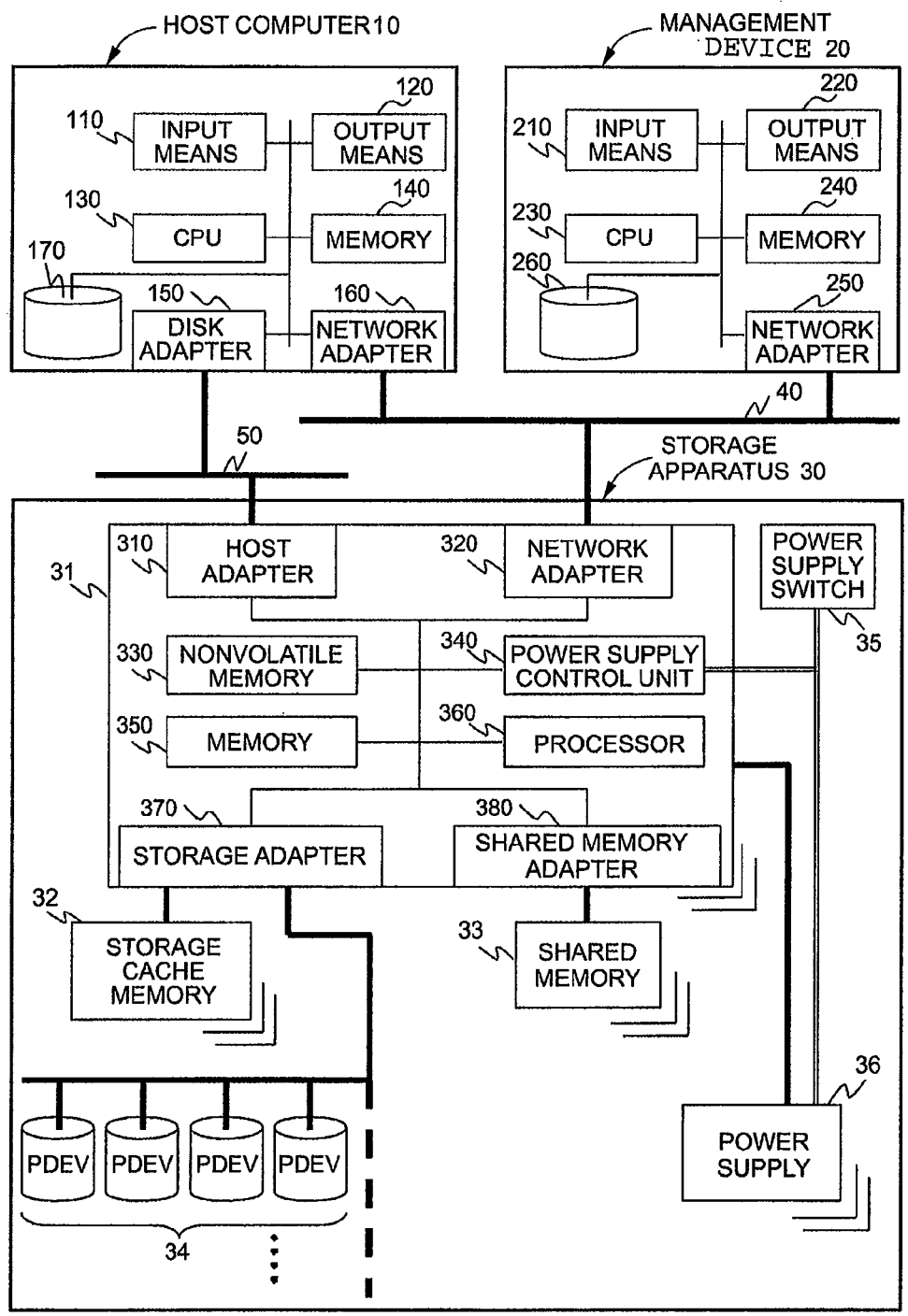
FIG. 1 is a hardware block diagram showing an embodiment of the computer system related to this invention.

An embodiment of this invention is described below. FIG. 1 is a hardware block diagram showing an example of a computer system related to this invention. The computer system includes a host computer 10, a management device 20, and a storage apparatus 30 to which the above-mentioned devices are connected. The storage apparatus is also referred to as a storage system or a storage subsystem.

The host computer 10 accesses the logical storage resources of the storage apparatus 30. The management device 20 manages the configuration of the storage areas in the storage apparatus 30. The storage apparatus 30 stores data in the storage areas set in the physical devices 34.

The host computer 10 includes an input means 110, an output means 120, a CPU 130, a memory 140, a disk adapter 150, a network adapter 160, and a disk drive 170. The input means 110 is a means for accepting inputs from the administrator operating the host computer 10 and others. The input means 110 is configured of, for example, a keyboard. The output means 120 is a means for displaying the status and the setting items of the host computer 10. The output means 120 is configured of, for example, a display device.

The CPU 130 reads the programs stored in the disk drive 170 to the memory 140, and performs the processing specified by the programs. The memory 140 is configured of, for example, a RAM and others, and stores programs, data, and others.

The disk adapter 150 is connected to the storage apparatus 30 via a storage network 50, and transmits and receives data to and from the storage apparatus 30. The storage network 50 is configured of protocols suitable for data transfer (e.g., Fibre Channel).

The network adapter 160 transmits and receives data to and from the storage system management device 20 or the storage apparatus 30 via the management network 40. The management network 40 is configured of, for example, Ethernet.

The disk drive 170 is configured of, for example, a hard disk device, and stores data and programs.

The management device 20 includes an input means 210, an output means 220, a CPU 230, a memory 240, a network adapter 250, and a disk drive 260.

The input means 210 is a means for accepting inputs from the administrator operating the management device 20 and others. The input means 210 is configured of, for example, a keyboard. The output means 220 is a means for displaying the status and the setting items of the management device 20. The output means 220 is configured of, for example, a display device.

The CPU 230 reads the management programs stored in the disk drive 260 to the memory 240, and performs the management processing for the storage apparatus based on the programs. The memory 240 is configured of, for example, a RAM and others, and stores programs, data, and others.

The network adapter 250 transmits and receives data to and from the host computer 10 or the storage apparatus 30 via the management network 40.

The disk drive 260 is configured of, for example, a hard disk device, and stores data and programs.

The storage apparatus 30 includes a controller 31, a storage cache memory 32, a shared memory 33, physical devices (PDEVs) 34, a power supply switch 35, and a power supply 36. The controller 31 controls the storage of data in storage areas configured in the PDEVs 34. The storage cache memory 32 temporarily stores the data read from and written into the PDEVs 34. The shared memory 33 stores the configuration information of the controller 31 and the PDEVs 34. The PDEVs 34 are configured of multiple disk devices. The power supply 36 supplies power to each unit in the storage apparatus 30. The power supply switch 35 is the switch for turning on and off the power supply from the power supply 36. The disk devices (storage apparatuses) are configured of, for example, hard disk drives, and mainly store user data. As the storage apparatuses, drives configured of a semiconductor memory such as a flash memory may also be used.

The controller 31 is configured of a host adapter 310, a network adapter 320, a nonvolatile memory 330, a power supply control unit 340, a memory 350, a processor 360, a storage adapter 370, and a shared memory adapter 380.

The host adapter 310 transmits and receives data to and from the host computer 10 via the storage network 50. The network adapter 320 transmits and receives data to and from the host computer 10 or the management device 20 via the storage network 40.

The nonvolatile memory 330 is configured of hard disks or flash memory, and stores the programs operating in the controller 31 and the configuration information. The power supply control unit 340 controls power supplied by the power supply 36.

The memory 350 is configured of, for example, RAM and others, and stores programs, data and others. The processor 360 reads the programs stored in the nonvolatile memory 330 to the memory 350, and performs the processing specified by the programs.

The storage adapter 370 transmits and receives data to and from the PDEVs 34 and the storage cache memory 32. The shared memory adapter 380 transmits and receives data to and from the shared memory 33.

Figure 2:
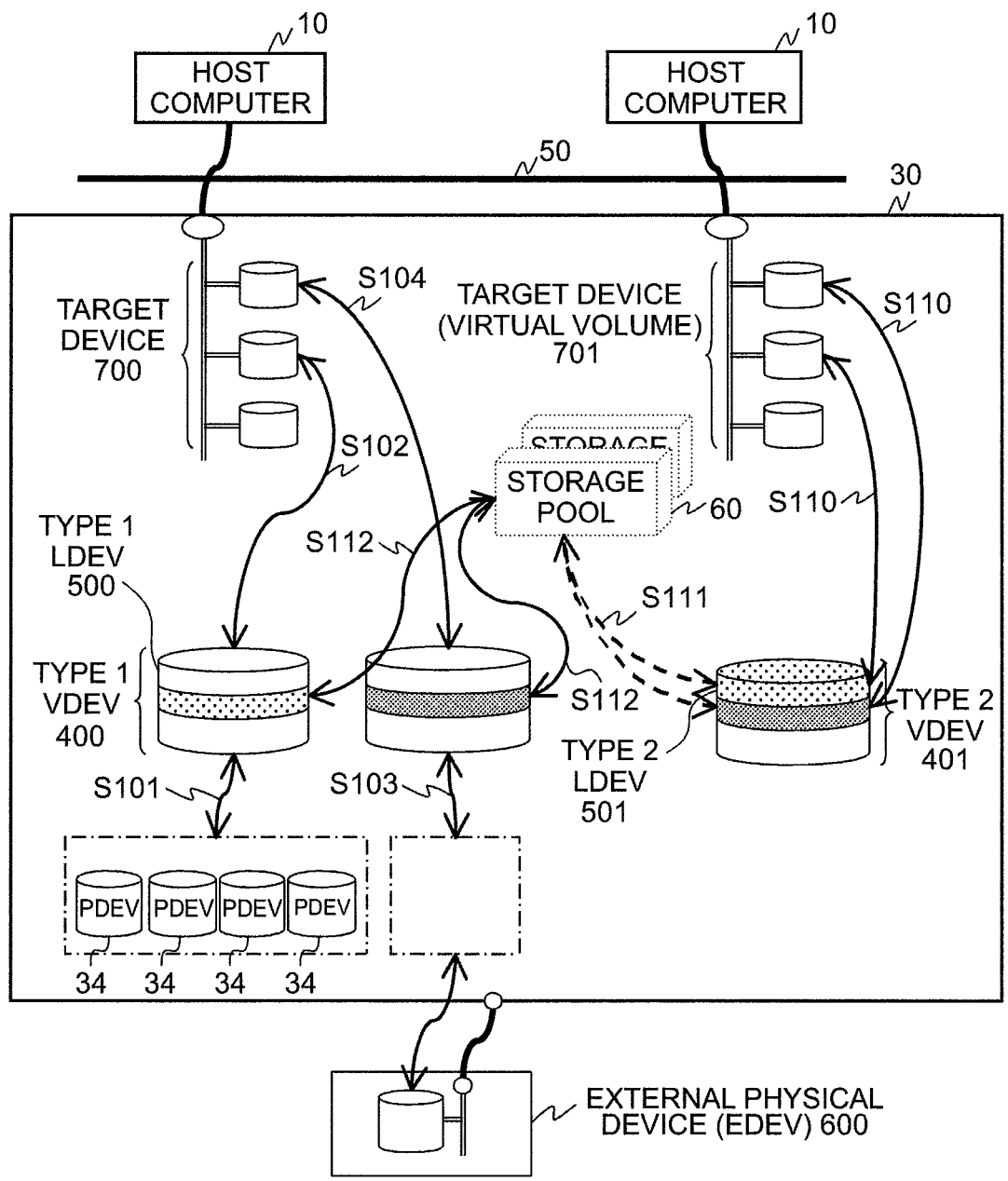
FIG. 2 is a function block diagram showing the operation of dynamically allocating storage areas performed by the storage apparatus in the computer system shown in FIG. 1.

FIG. 2 is a function block diagram showing the operation of dynamically allocating storage areas performed by the storage apparatus 30 in the computer system shown in FIG. 1. From the PDEVs 34, a RAID group is configured by the RAID configuration. From this RAID group, a virtual device (VDEV) 400 is configured (S101). The VDEV 400 is split into multiple logical devices (LDEVs) 500 which are storage areas. The VDEV configured of PDEVs 34 is called a "Type 1 VDEV." The LDEVs included in this Type 1 VDEV are called "LDEVs Type 1."

The host computer 10 accesses the volumes (logical areas) in the storage apparatus 30. The volumes seen from the host computer 10 are called "target devices." The target devices 700 are set by defining a path in the volume including the Type 1 LDEVs to the host computer 10 (S102).

External physical devices 600 connected outside the storage apparatus 30 may also be treated the same as the PDEVs 34. That is, by the RAID configuration, multiple Type 1 VDEVs 400 are configured from multiple external physical devices (EDEVs) 600 (S103). The Type 1 VDEVs 400 are split into one or more storage areas; i.e., LDEVs Type 1 500. The target devices 700 are set by setting a path in this LDEV Type 1 500 to the host computer 10 (S104).

Furthermore, in the storage apparatus 30, a Type 2 VDEV 401 can be set. The Type 2 VDEV is, unlike the Type 1 VDEV configured of the PDEVs 34, a virtual device including an address and an area but not including any areas corresponding with the PDEVs 34. It is possible to set a cache memory area for a Type 2 VDEV. For this Type 2 VDEV 401, one or more LDEVs are configured. This LDEV is called a Type 2 LDEV 501.

The target devices 701 are set by setting a path in this LDEV Type 2 501 to the host computer 10 (S110). These target devices correspond with the virtual volumes.

To Type 2 VDEVs and LDEVs Type 2, physical storage areas are not allocated from the PDEVs (they do not have any storage areas). For the host computer 10 to use them, the Type 2 LDEVs must be associated with storage pools (or simply called "pools") 60.

The storage pools 60 are groups of one or more LDEVs Type 1 500 that are coordinated by the storage pool attribute. The Type 1 LDEV 500 is allocated to a storage pool (S112). The Type 1 LDEV 500 is a pool volume.

This LDEV Type 1 500 set as a storage pool is associated with the Type 2 LDEV 501 by using an address (S111). This association is called "mapping" or "allocation."

By doing this, the host computer 10 can make write/read accesses to and from the virtual volumes. Furthermore, by changing the mapping between the Type 1 LDEV and the Type 2 LDEV, the storage areas of the virtual volumes can be changed.

Figure 3:
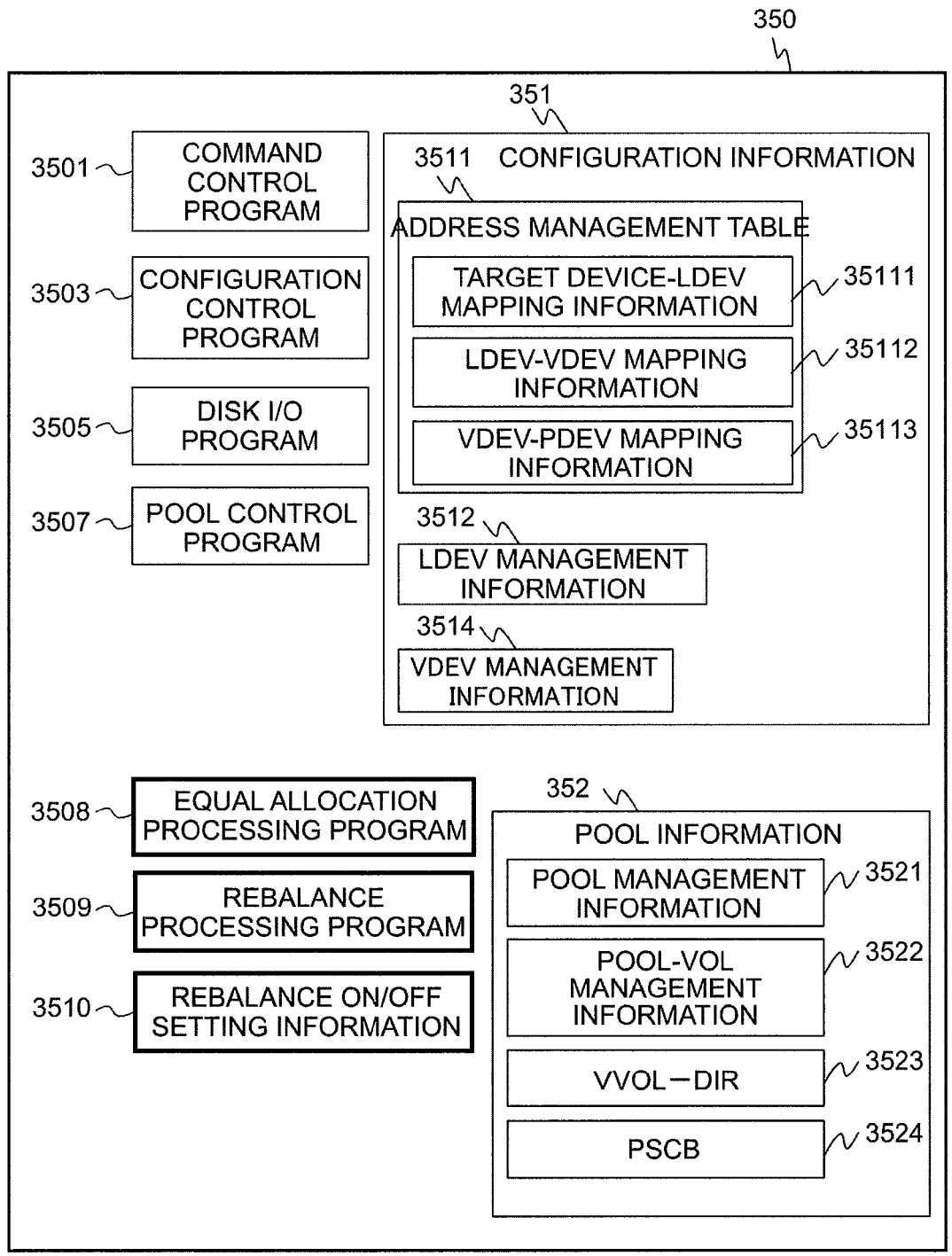
FIG. 3 is a memory block diagram of the storage apparatus.

FIG. 3 is a block diagram of a memory 350 in the storage apparatus 30. The memory 350 stores various types of programs read and performed by the processor 360, configuration information 351 related to the LDEV settings, and pool information 352 related to the storage pool settings.

A command control program 3501 interprets commands from the host computer 10 or the management device 20, and performs the processing specified by the commands. A configuration control program 3503 controls the configuration of the storage apparatus 30. A disk I/O program 3505 controls accesses to the PDEVs 34. A pool control program 3507 sets storage pools.

The configuration information 351 stores the settings related to the VDEVs and LDEVs in the storage apparatus 30. The pool information 352 stores the settings related to the storage pools.

The configuration information 351 includes an address management table 3511, LDEV management information 3512, and VDEV management information 3514.

The address management table 3511 stores the address mapping information among target devices, LDEVs, VDEVs, and physical devices. The address management table 3511 includes target device-LDEV mapping information 35111, LDEV-VDEV mapping information 35112, and VDEV-PDEV mapping information 35113. The LDEV management information 3512 stores the information related to the LDEVs. The VDEV management information 3514 stores the information related to virtual logical volumes.

The pool information 352 includes POOL management information 3521, POOL-VOL management information 3522, VVOL-DIR 3523, and PSCB 3524. The POOL management information 3521 stores the settings of the storage pools. The POOL-VOL management information 3522 stores the information of the volumes in the storage pools. The VVOL-DIR 3523 stores the address allocation to the LDEVs in the storage pools. The PSCB information stores the information of the addresses of the LDEVs in the storage pools.

Furthermore, the memory 350 includes an allocation processing program 3508 for equally allocating storage areas from the PDEVs to the multiple LDEVs (pool volumes) 500 belonging to the storage pools and a rebalance processing program 3509 for equalizing the storage capacity of multiple pool volumes by migrating storage areas among multiple pool volumes.

Furthermore, the memory 350 includes flag information capable of setting whether to perform rebalance or not in units of pools or in units of virtual volumes.

Figure 4:
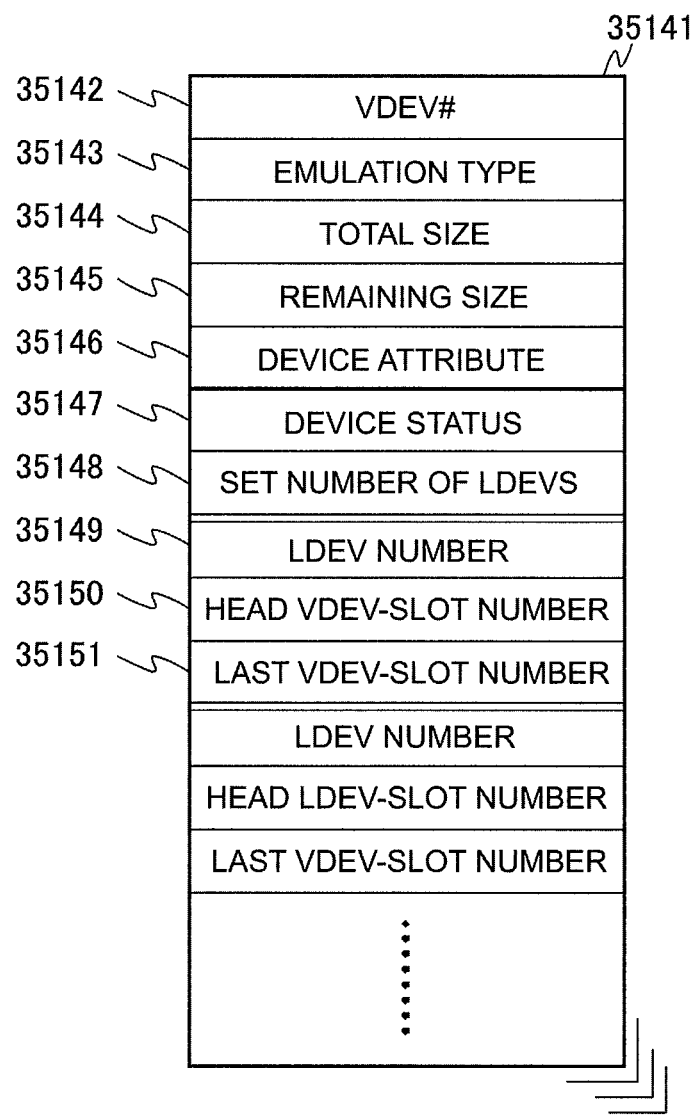
FIG. 4 is a block diagram showing the VDEV management information.

FIG. 4 is a block diagram showing the VDEV management information. The VDEV management information is configured of the VDEV unique information 35141. The VDEV unique information 35141 is configured of the VDEV number (VDEV #) 35142, the emulation type 35143, the total size 35144, the remaining size 35145, the device attribute 35146, the device status 35147, the set number of LDEVs 35148, the LDEV number 35149, the head VDEV-SLOT #35150, and the last VDEV-SLOT #35151.

The VDEV #(VDEV number) 35142 is the identifier of the VDEV. The emulation type 35143 is the identifier of the emulation type of the VDEV. The total size 35144 is the total size set for the VDEV. The remaining size 35145 is the size of the unused area in the VDEV.

The device attribute 35146 is the identifier of the attribute defined for the VDEV. If the VDEV is a Type 1 VDEV, the identifier showing the Type 1 VDEV is stored and, if the VDEV is a Type 2 VDEV and set as a virtual volume, the identifier showing the Type 2 VDEV is stored.

The device status 35147 is the identifier showing the VDEV status. The VDEV status includes normal, blockade, failure blockade, and others. Blockade shows the blockade due to a cause other than the occurrence of a failure such as puncture blockade. Failure blockade shows the blockade due to the occurrence of a failure in any one of the devices.

The set number of LDEVs 35148 is the total number of LDEVs set for the VDEVs. The LDEV number 35149 stores the numbers of the LDEVs set in the VDEV. The head VDEV-SLOT #35150 is the identifier of the physically head slot number of the set LDEV.

The last VDEV-SLOT #35151 is the physically last slot number of the set LDEV. The above-mentioned LDEV number 35149, the head VDEV-SLOT #35150, and the last VDEV-SLOT #35151 are set for each LDEV number; i.e., the same number as that of LDEVs.

Figure 5:
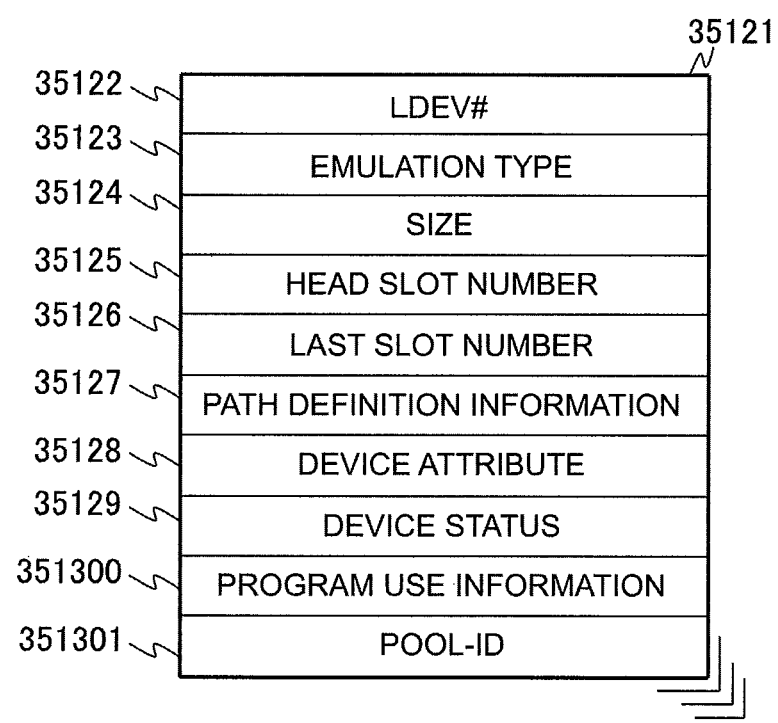
FIG. 5 is a block diagram showing the LDEV management information.

FIG. 5 is a block diagram showing the LDEV management information. The LDEV management information is configured of VDEV unique information 35121. The VDEV unique information 35121 is configured of the LDEV number (LDEV #) 35122, the emulation type 35123, the size 35124, the head slot number 35125, the last slot number 35126, the path definition information 35127, the device attribute 35128, the device status 35129, the program use status 351300, and the POOL-ID 351301.

The LDEV #35122 is the identifier of the LDEV. The emulation type 35123 is the identifier of the emulation type of the LDEV. The size 35124 is the total size set for the LDEV.

The head slot number 35125 is the identifier of the head slot number of the set LDEV. The last slot number 35126 is the last slot number of the set LDEV. The path definition information 35127 is the identifier of the path defined for the host computer 10.

The device attribute 35128 is the identifier of the LDEV attribute. If the LDEV is a Type 1 LDEV, the identifier showing the Type 1 LDEV is stored and, if the LDEV is a LDEV Type 2, the identifier showing the Type 2 LDEV is stored. Furthermore, if the LDEV is set in the storage pool, the identifier showing the pool attribute is stored.

The device status 35129 is the identifier showing the status of the VDEV to which the LDEV belongs. The status of the VDEV includes normal, blockade, failure blockade, and others. Blockade shows the blockade due to a cause other than the occurrence of a failure such as puncture blockade. Failure blockade shows the blockade due to the occurrence of a failure in any one of the devices.

The program use status 351300 stores, if the LDEV is being used by a program, the identifier of the program. The POOL-ID 351301, if the LDEV is set in the storage pool, stores the identifier.

Figure 6:
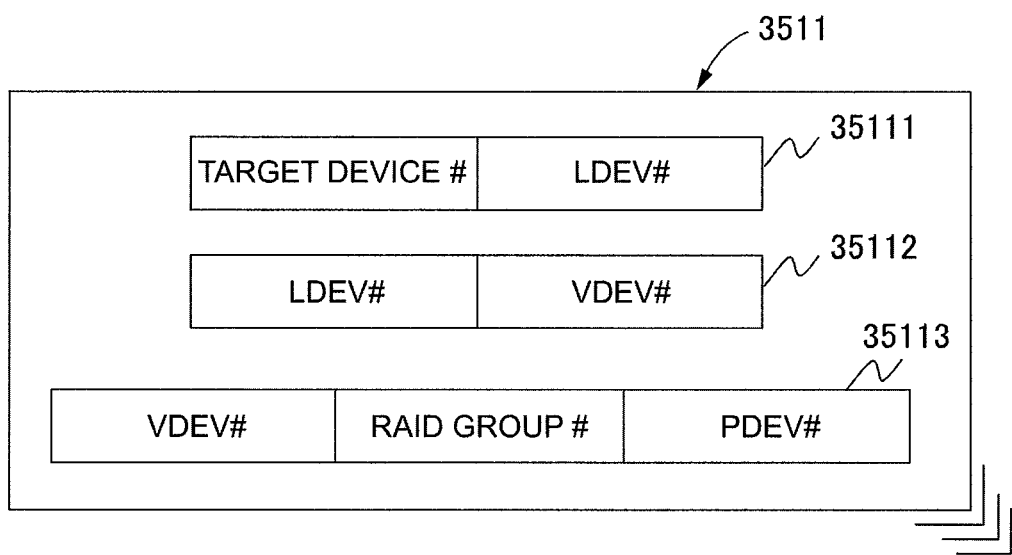
FIG. 6 is a block diagram showing the address management table.

FIG. 6 is a block diagram showing the address management table. The address management table 3511 stores the mapping information of a target device, LDEV, and VDEV. The address management table 3511 includes the target device-LDEV mapping information 35111, the LDEV-VDEV mapping information 35112, and the VDEV-PDEV mapping information 35113.

The target device-LDEV mapping information 35111 stores the correspondence of the target device address with the LDEV address. The LDEV-VDEV mapping information 35112 stores the LDEV address and the VDEV address.

The VDEV-PDEV mapping information 35113 stores the VDEV address and the RAID group (or parity group) number for the same, and the PDEV address.

The storage apparatus 30, by referring to this address management table, can ascertain which address of which LDEV the target device address corresponds with. It can also be ascertained which address of which VDEV the LDEV address corresponds with. Furthermore, it can also be ascertained which RAID group the VDEV address belongs to and which address of which PDEV the VDEV address corresponds with.

Figure 7:
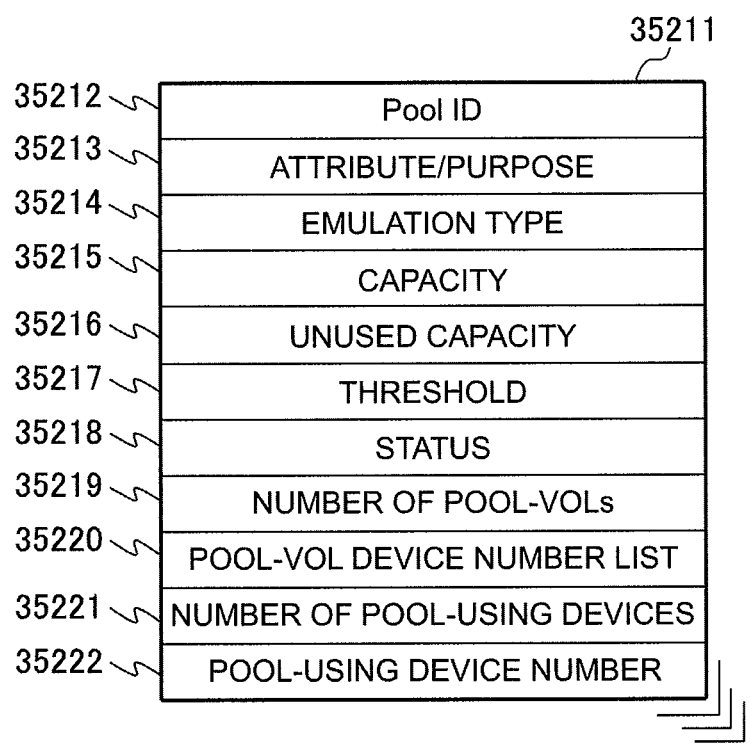
FIG. 7 is a block diagram showing the POOL management information.

FIG. 7 is a block diagram showing the POOL management information. The POOL management information 3521 is configured of POOL unique information 35211. The POOL unique information 35211 is configured of the POOL-ID 35212, the attribute/purpose 35213, the emulation type 35214, the capacity 35215, the unused capacity 35216, the threshold 35217, the status 35218, the number of POOL-VOLs 35219, the POOL-VOL device number list 35220, the number of POOL-using devices 35221, and the POOL-using device numbers 35222.

The POOL-ID 35212 is the identifier of the POOL. The attribute/purpose 35213 is the identifier showing the attribute and the purpose of the storage pool. The purpose is the purpose in the operation form such as snapshots and SYS areas.

The emulation type 35214 is the identifier of the emulation type of the storage pool. The capacity 35215 is the total capacity of the storage pool. The unused capacity 35216 is the size of the unused area in the storage pool.

The threshold 35217 is the maximum data storage capacity allowed by the storage pool. The status 35218 is the current status of the storage pool, for example, being defined, being extended, valid, etc. The POOL-VOL number 35219 is the total number of LDEVs set as the storage pool.

The POOL-VOL device number list 35220 is a list of LDEV numbers set as the storage pool. The number of POOL-using devices 35221 is the number of the Type 2 LDEVs with which the LDEVs of the storage pool are associated. The POOL-using device number 35222 is a list of the numbers of the Type 2 LDEVs with which the LDEVs of the storage pool are associated.

Figure 8:
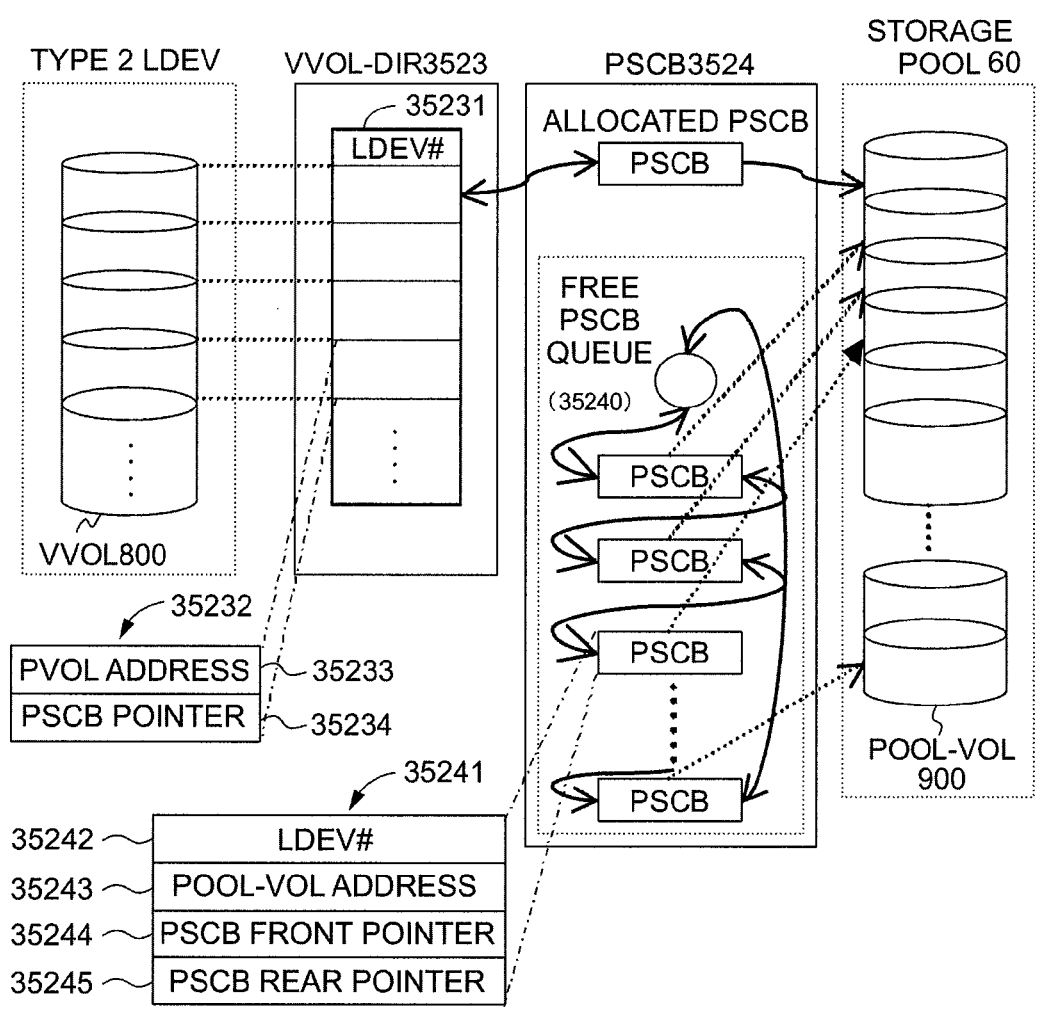
FIG. 8 is a block diagram showing the VVOL-DIR and the PSCB.

FIG. 8 is a block diagram showing the VVOL-DIR 3523 and the PSCB 3524. The VVOL-DIR 3523 is the configuration information of the Type 2 LDEVs which are the storage areas of the virtual volume. The PSCB (POOL Slot Control Block) 3524 is the configuration information of the Type 1 LDEVs as a storage pool.

As mentioned above, the storage apparatus 30 configures a Type 1 VDEV from the PDEVs 34 by the RAID configuration. This Type 1 VDEV is split into LDEVs Type 1 which are storage areas. The LDEVs Type 1 are set as the storage pool. The volume configured of these LDEVs Type 1 set as the storage pool is considered to be a POOL-VOL 900.

Furthermore, the storage apparatus 30 sets a virtual volume (VVOL) 800 and configures a Type 2 VDEV. This type of Type 2 VDEV is split into LDEVs Type 2 which are storage areas.

The storage apparatus 30 allocates the Type 2 LDEVs of the VVOL 800 to the Type 1 LDEVs of the POOL-VOL 900. By doing this, the storage areas of the virtual volumes accessed by the host computer 10 are set for the Type 1 LDEVs configured of the PDEVs 34 which are physical devices.

The VVOL configuration is stored in the VVOL-DIR 3523. The VVOL-DIR 3523 is configured of the LDEV number (LDEV #) 35231 and the entry 35232.

The LDEV number (LDEV #) 35231 is the identifier of the Type 2 LDEV. The entry 35232 is the configuration information of the Type 2 LDEV. This entry 35232 is configured of the Type 2 LDEV address 35233 and the PSCB pointer 35234.

The Type 2 LDEV address 35233 stores the address of the Type 2 LDEV of the VVOL.

The PSCB pointer 35234, if the Type 2 LDEV is allocated to the Type 1 LDEV of the POOL-VOL 900, stores the pointer for the area of the Type 1 LDEV. Note that, as the Type 2

LDEV is not allocated to the Type 1 LDEV in the initial status, the PSCB pointer 35234 stores "NULL."

The PSCB (POOL Slot Control Block) 3524 is the information of the Type 1 LDEV set in the storage pool. This PSCB 3524 is set for each slot of the Type 1 LDEVs set in the storage pool.

The PSCB 3524 is configured of the LDEV number (LDEV #) 35241, the POOL-VOL address 35242, the PSCB front pointer 35243 and the PSCB rear pointer 35244.

The LDEV number (LDEV #) 35241 is the identifier of the Type 1 LDEV in the POOL-VOL. The POOL-VOL address 35242 is the address of the Type 1 LDEV in the POOL-VOL 900.

The PSCB front pointer 35243 and the PSCB rear pointer 35244 are the identifiers of the front and rear slots of the Type 1 LDEV in the POOL-VOL 900.

Furthermore, among the areas in the POOL-VOL 900, as for the unused area, its head is shown by the free PSCB queue 35240. The free PSCB queue 35240 includes the pointer for the PSCB 3524 showing the next slot.

The storage apparatus 30, referring to the pointer shown by the free PSCB queue 35240, obtains the next PSCB 3524. Furthermore, referring to the PSCB rear pointer 35245 of the next PSCB 3524, the storage apparatus 30 gradually traces PSCBs 3524, and obtains the PSCB 3524 corresponding with the last slot of the unused area.

The PSCB rear pointer 35244 of this last PSCB 3524 is the free PSCB queue 35240. The storage apparatus 30 traces the free PSCB queues 35240 and, by the set linked by the pointers of the PSCBs 3524, can ascertain the unused areas of the POOL-VOLs 900 in the storage pool.

The storage apparatus 30 sets the PSCBs 3524 corresponding with the Type 1 LDEVs set as the storage pool. As more specifically described, the PSCB 3524 corresponding with each slot of the Type 1 LDEVs set as the storage pool is set, and the free PSCB queue 35240 is also set. As the entire storage pool is unused in the initial status, the set linked by the free PSCB queue 35240 corresponds with all the areas in the Type 1 LDEVs set as the storage pool.

When the storage apparatus 30 uses the areas of this storage pool, by allocating the PSCBs 3524 for the required slots to the VVOL-DIR 3523 which are LDEVs Type 2, the relevant areas become usable. Multiple sets of slots correspond with pages. Pages are specified from multiple PSCBs. Accesses from the host device to VVOLs 800 and allocation of storage areas from the POOL-VOLs to the access areas of the VVOLs 800 is performed in units of pages.

As more specifically described, the storage apparatus 30 refers to the free PSCB queue 35240, and then obtains the PSCB 3524 for the required areas (pages) to be allocated to the Type 2 LDEVs. Each of these obtained PSCBs 3524 is allocated to the entry of the VVOL-DIR 3523. That is, the PSCB pointer 35234 of each entry of the VVOL-DIR 3523 stores the pointer showing the corresponding PSCB 3524.

Note that the allocated PSCBs 3524 are excluded from the linkage by the free PSCB queue 35240.

By this processing, each page (slot) of the Type 2 LDEVs is allocated to the PSCB 3524 shown by the PSCB pointer 35234 of each entry of the VVOL-DIR 3523. As the PSCBs 3524 correspond with the slots of the Type 1 LDEVs, as a result, the Type 2 LDEVs are allocated to the Type 1 LDEVs, and the virtual volumes as the access targets of the host computer 10 become usable as physical devices.

Figure 9:
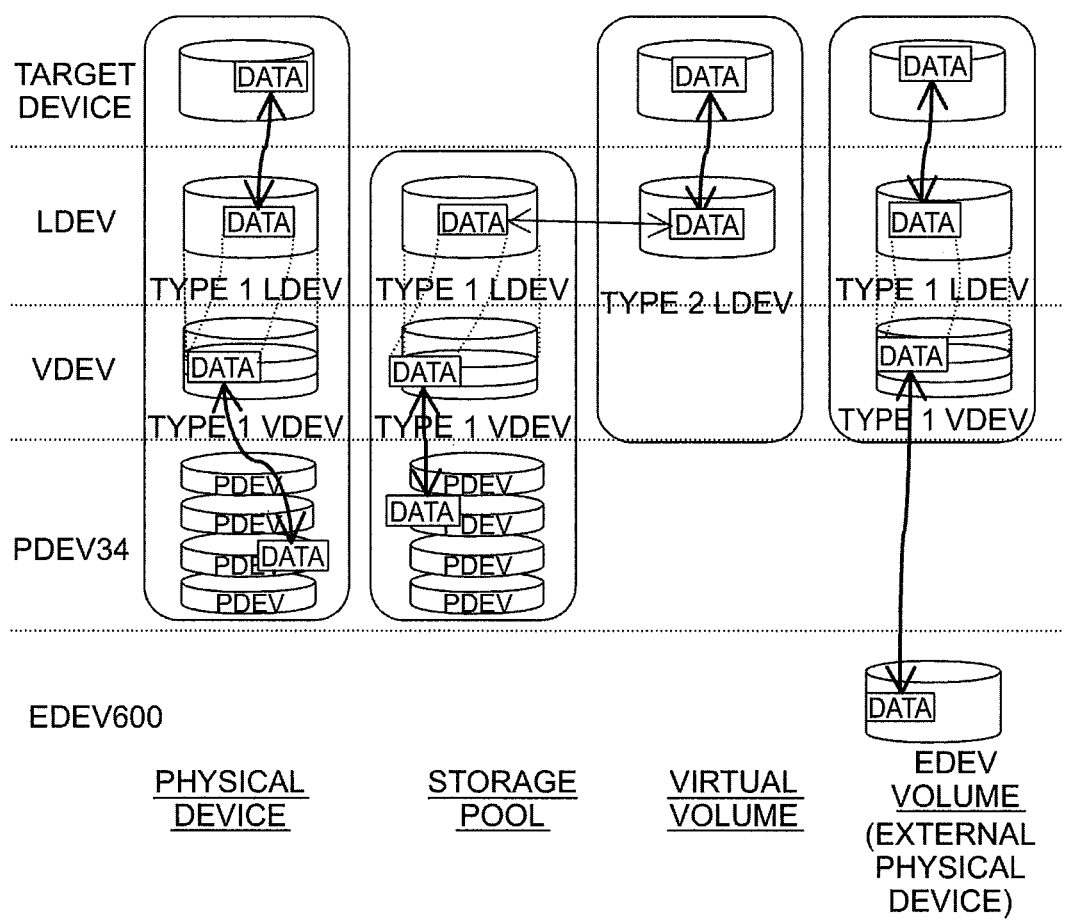
FIG. 9 is a block diagram showing the mapping relationship among target devices, LDEVs and PDEVs.

FIG. 9 is a block diagram showing the relationship among target devices, LDEVs and PDEVs. The host computer 10 accesses the target device 700 set in the storage apparatus 30. The storage area of the target device 700 is a Type 1 LDEV 500.

The Type 1 LDEV 500 is the area of the Type 1 VDEV 400 configured by the RAID configuration from the physical volume. The Type 1 VDEV 400 is split into one or more LDEVs Type 1 500.

Furthermore, the host computer 10 accesses the virtual volume set in the storage apparatus 30 as a target device 701. The virtual storage area of this target device 701 is a Type 2 LDEV 501. The Type 2 LDEV 501 is associated with the Type 1 LDEV 500 set as a storage pool.

The host computer 10 accesses the target device 701 which is a virtual volume. The storage area of this virtual volume is a Type 2 LDEV 501. The storage apparatus 30, when receiving an access to the Type 2 LDEV 501, converts the Type 1 LDEV 500 associated with the Type 2 LDEV 501 into the access destination.

Figure 10:
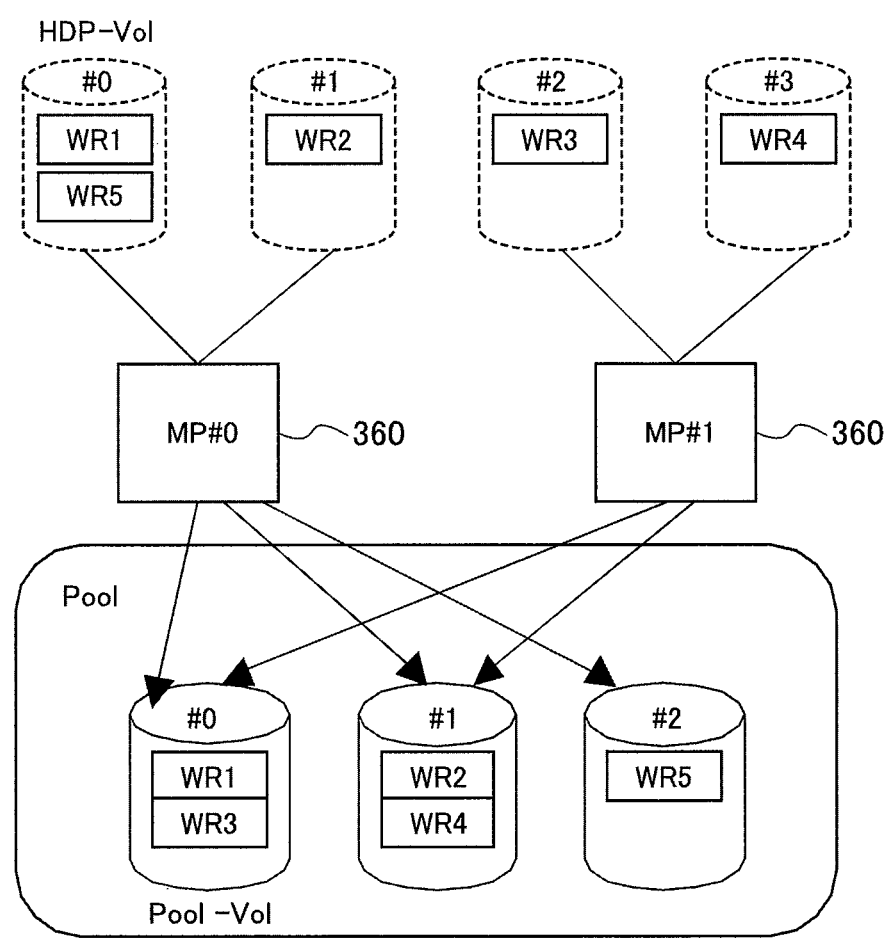
FIG. 10 is a block diagram showing the process in which pages are equally allocated among a virtual volume and pool volumes.

FIG. 10 shows the process in which pages as access targets and units of storage areas are equally allocated among a virtual volume (Type 2 LDEV) and multiple pool volumes (Type 1 LDEVs).

In FIG. 10, for the accesses to the virtual volume (HDP-Vol) #0 and the virtual volume #1 from the host computer, the processor (MP) #0 allocates pages from the pool volumes (Pool-Vols) #0 to #2 to the virtual volumes #0 and #1.

For the accesses to the virtual volume #2 and the virtual volume #3 from the host computer, the processor (MP) #1 allocates pages from the pool volumes (Pool-Vols) #0 to #2 to the virtual volumes #2 and #3.

Accesses from the host computer are made to the virtual volumes #0 to #3 sequentially, such as WR1 to WR5. MP #0 allocates the page (WR1) of the pool volume #0 to the page (WR1) of the virtual volume #0 accessed by the host computer, and allocates the page (WR2) of the pool volume #1 to the page (WR2) of the virtual volume #1 accessed by the host computer.

Next, the MP #1 allocates the page (WR3) of the pool volume #0 to the page (WR3) of the virtual volume #2 accessed by the host computer, and allocates the page (WR4) of the pool volume #1 to the page (WR4) of the virtual volume #3 accessed by the host computer.

Next, the MP #0 allocates the page (WR5) of the pool volume #2 to the page (WR5) of the virtual volume #0 accessed by the host computer.

Figure 11:
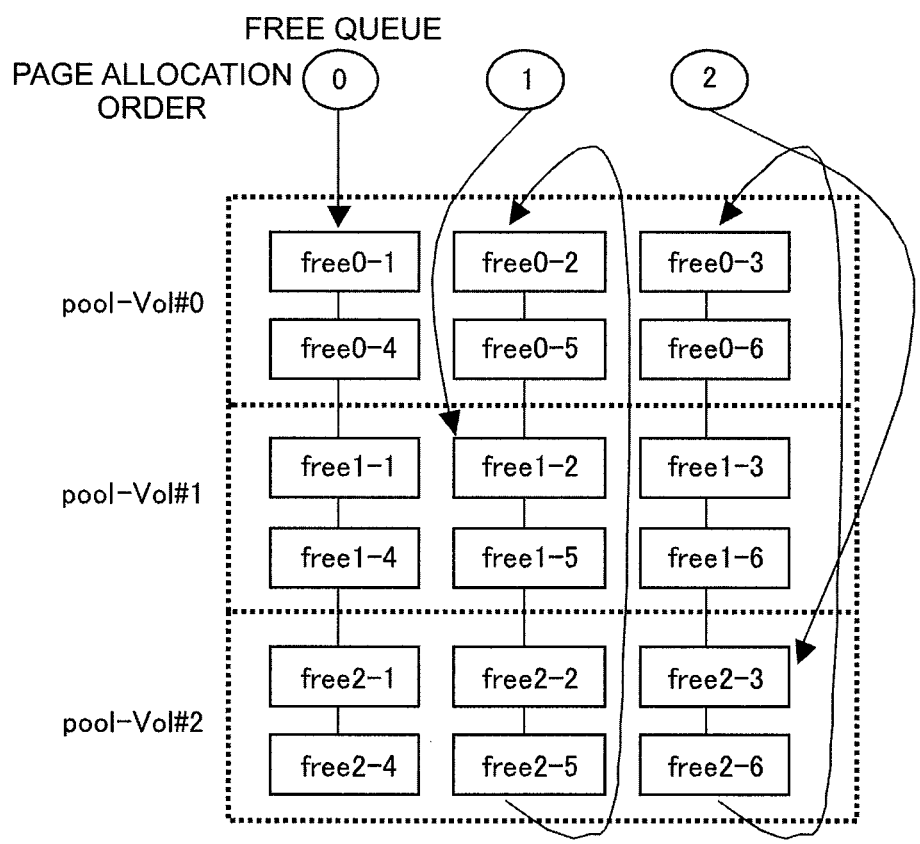
FIG. 11 is a block diagram showing the configuration of free queues in the above-mentioned case.

This allocation is achieved by the above-mentioned queue structure in FIG. 8. FIG. 11 is an example of the conventional free queue structure. The addresses of unallocated pages in each pool volume (freeM-N: M shows that the page belongs to the pool volume #M, and N shows that the page is the Nth unallocated page of the pool volume M) are sequentially connected to the free queues from (0) to (2). Each MP accesses the free queues from (0) to (2) sequentially, and allocates unallocated areas of the pool volumes to the virtual volumes.

The MP #0 accesses the free queue (0). As free0-1 is connected to the free queue (0) at first, the first unallocated page of the pool volume #0 is allocated to the page WR1 of the virtual volume #0. This unallocated page becomes the allocated (used) page (WR1).

Next, the MP #0 accesses the free queue (1). As free1-2 is connected to the free queue (1) at first, the second unallocated page of the pool volume #1 is allocated to the page WR2 of the virtual volume #1. This unallocated page becomes the allocated (used) page (WR2).

Next, the MP #1 accesses the free queue (0). As free0-1 of the free queue (0) was used for allocation, the next free0-4 is selected, and is allocated to the page WR3 of the virtual volume. The page used for the allocation is released from the free queue.

Next, the MP #1 accesses the free queue (1). As free1-2 of the free queue (1) was used for allocation, the next free1-5 is selected, and is allocated to the page WR4 of the virtual volume.

Next, the MP #0 accesses the free queue (2). As the free queue (2) is connected to free2-3 at first, the third unallocated page of the pool volume #2 is allocated to the page WR5 of the virtual volume #0.

As shown in FIG. 11, for making the equal number of allocated pages exist for multiple pool volumes, the pool volumes to which the free areas connected to the free queues belong are supposed to shift next by each free queue. Furthermore, the page allocation order for the accesses from the host computer, that is, free queue #0→#1→#2→#0→#1 . . .
is stored in the memory 350 as the page allocation order management table. The processor always refers to this order table and performs page allocation. The processor stores write data from the host device in the pages allocated in the virtual volumes.

Figure 12:
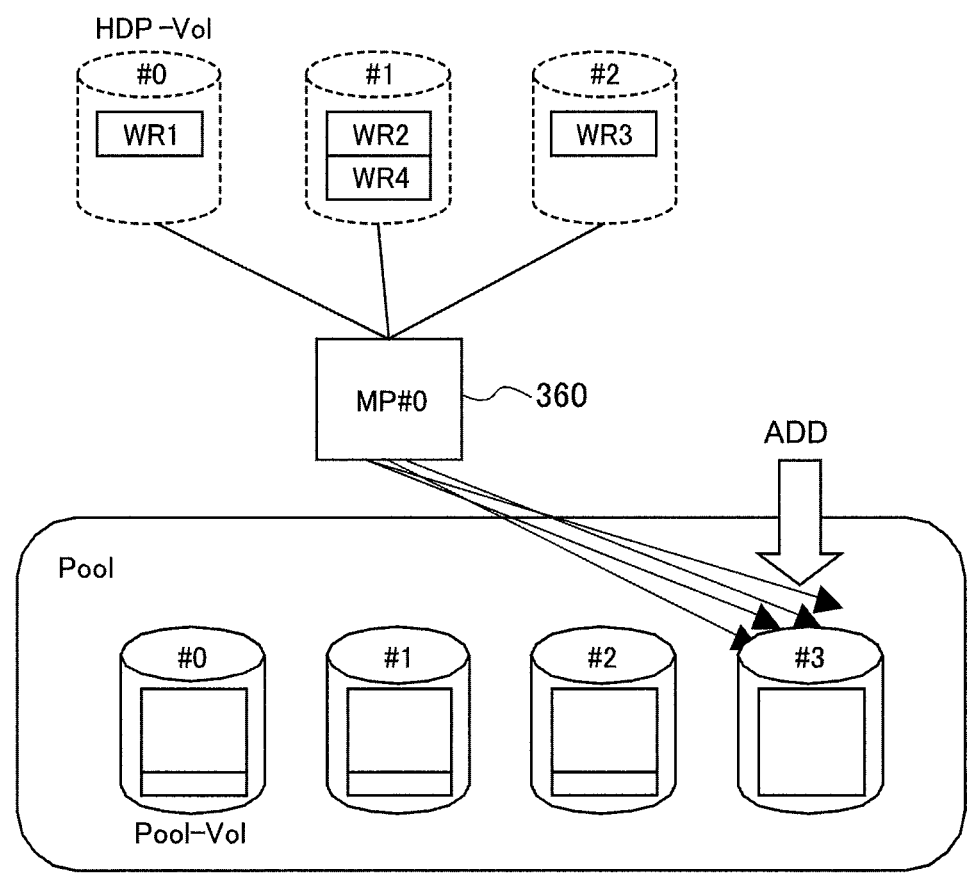
FIG. 12 is a block diagram showing the case that the page allocation concentrates in the pool volume added to the pool.
Figure 13:
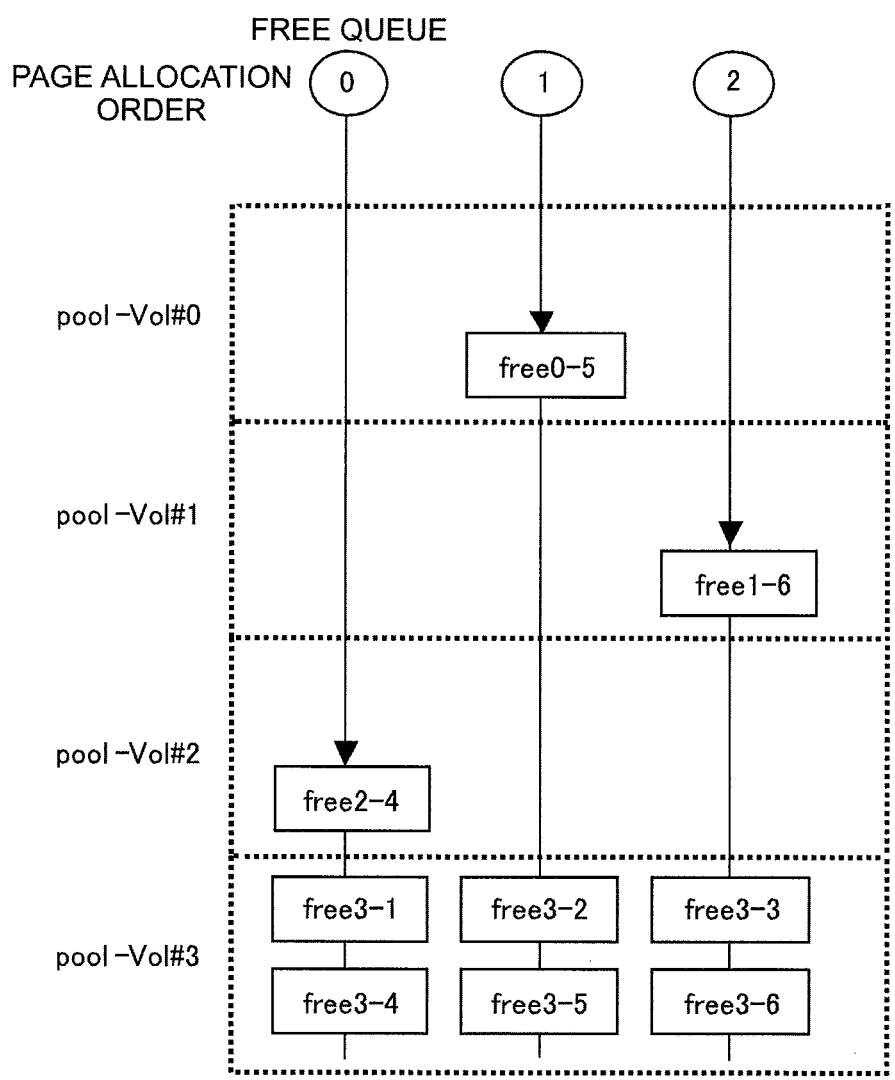
FIG. 13 is a block diagram showing the configuration of free queues in the above-mentioned case.

FIG. 12 shows the process in which the pool volume #3 is added when the number of unallocated pages in the pool volumes #0 to #2 belonging to the pool decreased. FIG. 13 shows the queue structure for managing the unused areas of the added pool volume. As the pool volume #3 was newly added, a large number of unused areas of the pool volume #3 are connected to each of the free queues.

In the embodiment of FIG. 10, for distributing the load from access processing from the host computer by setting multiple processors, a different virtual volume is allocated to each processor. As the accesses from the host computer to the virtual volumes do not become equal among the multiple virtual volumes, with the passage of time, the balance of the rates of used pages among multiple pages is lost.

Furthermore, in the embodiment of FIG. 13, as accesses from the processor concentrate in the pool volume #3 including a number of free areas, the processing performance for I/O from the host computer might be deteriorated.

Figure 14:
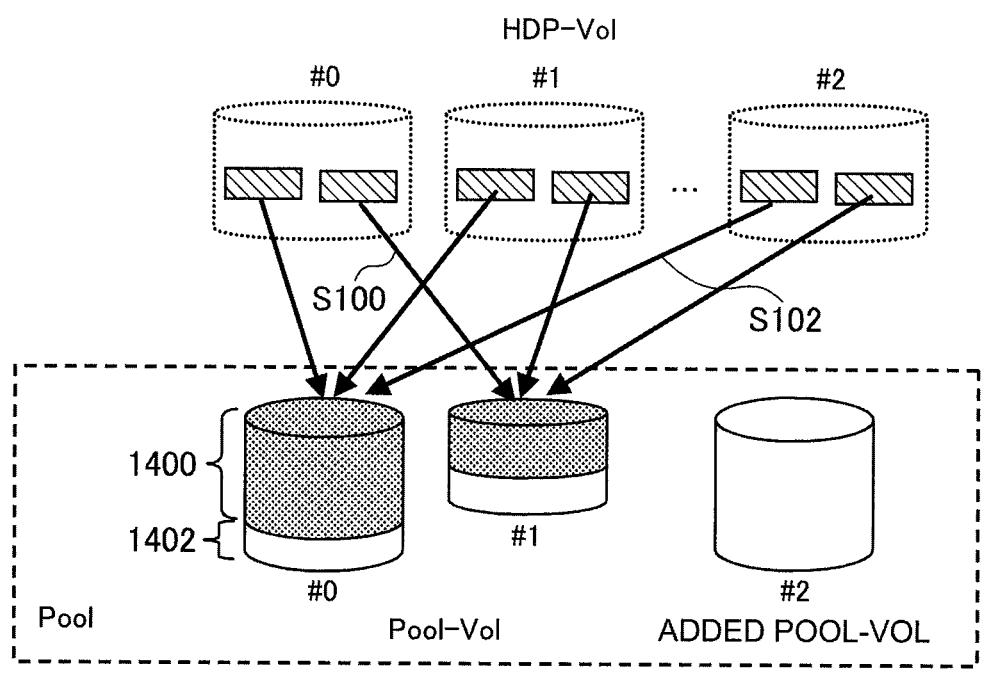
FIG. 14 is a block diagram of a virtual volume and pool volumes before the page rebalance processing.
Figure 15:
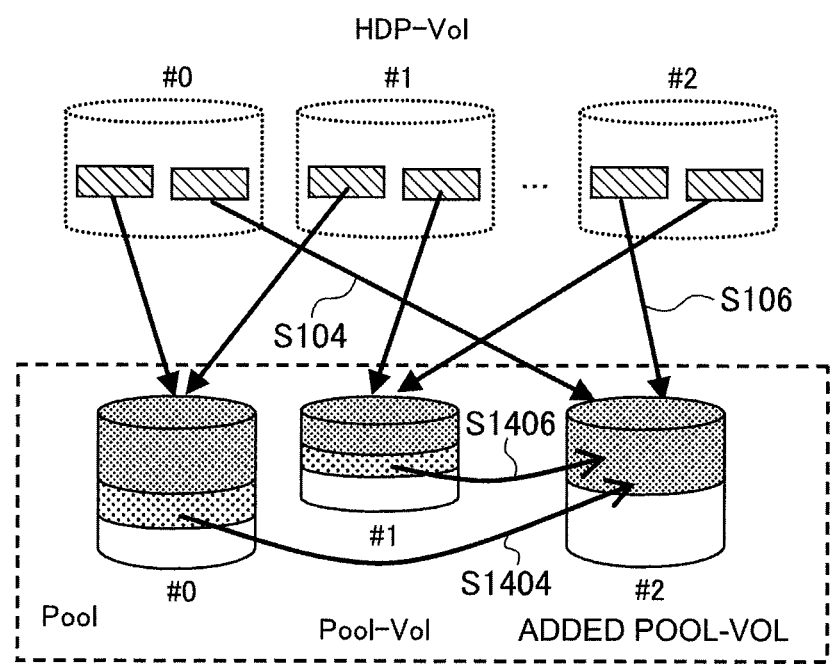
FIG. 15 is a block diagram of a virtual volume and pool volumes after the page rebalance processing.

Therefore, as shown in FIG. 14 and FIG. 15, the processor causes the allocated pages to migrate from the existing pool volumes to the pool volume added to the pool and equalizes the rate of the allocated pages among the existing pool volumes and the added pool volume.

FIG. 14 shows the status before the above-mentioned processing and FIG. 15 shows the status after the above-mentioned processing. In FIG. 14, 1400 is the used area for which the page allocation was performed, and 1402 is the unused area. As shown in FIG. 15, the data of a part of the used pages in the pool volume #0 is copied to the unused pages of the added pool volume #2 (S1404), and further, the data of a part of the used pages in the pool volume #1 is copied to the unused pages of the pool volume #2 (S1406).

Then, the processor changes the allocation from the virtual volume #0 to the pool volume #1 (S100) to the allocation to the pool volume #2 (S104), and changes the allocation from the virtual volume #2 to the pool volume #0 (S102) to the allocation to the pool volume #2 (S106). This sequence of process is called page migration.

The process from FIG. 14 to FIG. 15 shows that the multiple used pages are relocated and equalized among multiple pool volumes, that is, the page rebalance is achieved. Equal page allocation is performed among multiple volumes in the pool by the processor performing the equal allocation program 3508. The processor performs the rebalance program 3509 and performs the rebalance processing.

As a result of the above-mentioned processing, the page allocation for the entire multiple pool volumes becomes equal, and therefore, the I/O rate for each of the multiple pool volumes becomes the same level, and the processing performance of the storage apparatus for the accesses from the host device is kept appropriate even after adding pool volumes.

Note that, depending on the date and time of updating the data in the migration source pages, the newer the date and time of update, when migrating data to the migration destination pages, the closer to the outer edge of the hard disk the data of the migration source pages is copied.

For equalizing the number of allocated pages among the multiple pool volumes, it is important to consider the capacity of the pool volumes. That is, it is important to equalize the rate of pages used for the allocation (page usage rate) of all the pages (equivalent to "the total number of pages that can be allocated: the pool volume capacity") among the multiple pool volumes. The same consideration is important if the page usage rate is calculated by the storage capacity instead of the number of pages.

Figure 16:
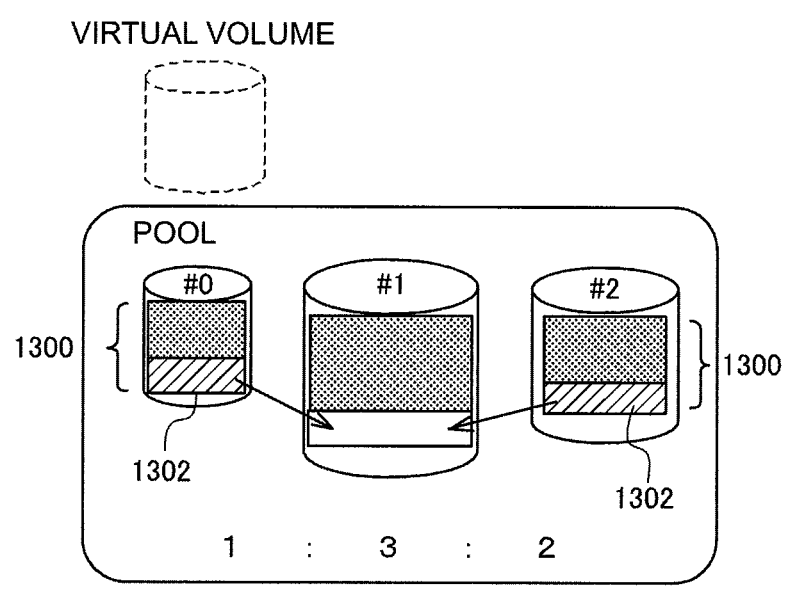
FIG. 16 is a block diagram of a virtual volume and pool volumes showing the process of considering the capacity ratio of pool volumes and performing the rebalance among the multiple pool volumes.

FIG. 16 is a block diagram showing the above-mentioned consideration. The reference sign 1300 is the total capacity of the pages allocated to each volume, and 1302 is the capacity of the pages to be migrated among the volumes. For the capacity ratio of the pool volumes, the pool volume #0:#1:#2 is 1:3:2.

Therefore, for equalizing the page usage rate, pages are migrated to the pool volume #1 from the pool volumes #0 and #2 respectively.

FIG. 17A is a table for managing a pool, and FIG. 17B is a table for managing a pool volume. These tables are stored in the memory 350 as part of the pool information 352 (FIG. 3). These tables are created from the management information. The rebalance processing program 3509 of the storage system refers to these tables and establishes the rebalance processing system described in FIG. 15.

FIG. 17C is a table for managing a free queue unit. The allocation of unused pages to the access areas in the virtual volume is, as mentioned above, managed by free queues. The free queues are set in units of pool volumes. To the free queue, the multiple unused pages of the pool volumes are connected by a FIFO structure. When unused pages are allocated to the virtual volume, the unused pages are sequentially released from the free queue, and processed as the destination of mapping from the virtual volume and of data copy.

This table is configured of the free queue identification number (#), the pool volume # as the target of the management for unused areas by the free queue, the number of free areas linked to the free queue, and the pool # to which the free queue belongs. This table is also recorded in the memory 350 as a part of the pool information.

Figure 18:
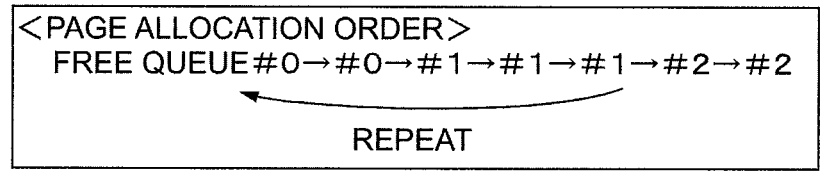
FIG. 18 is a block diagram showing the order of allocating pages from pool volumes belonging to the pool to the virtual volume in response to a write access from the host device to the virtual volume.

FIG. 18 is a block diagram showing the order of allocating pages from pool volumes belonging to the pool to the virtual volume in response to a write access from the host device to the virtual volume. The description here assumed the pool including multiple pool volumes whose storage capacity ratio is 2:3:2.

For allocating pages of the virtual volume to the pool volumes equally, it is required to specify the order of page allocation for the volumes including the volumes added to the pool volumes. This allocation order is registered in the memory as the management information (refer to FIG. 19).

The equal allocation processing program 3508 refers to this management information, calculates the address of the targeted free queue from the multiple free queues, obtains the addresses of the unused pages connected to the free queues (pointer information: PSCB), and stores the write data transmitted to the pages of the virtual address from the host device in those addresses.

For realizing this, the free queue address and the pool volume identification information correspond with each other by 1:1. For example, the free queue #0 manages the free area of the pool volume #0, the free queue #1 manages the free area of the pool volume #1, and the free queue #2 manages the free area of the pool volume #2.

FIG. 18 shows that the pages are allocated to the pool volume #0 twice in a row, then to the pool volume #1 three times in a row, and further to the pool volume #2 twice in a row, and this cycle is repeated afterwards.

Figure 19:
FIG. 19 is a table for managing this allocation order.

FIG. 19 is a table for managing this allocation order and registers the allocating method shown in FIG. 18. This table is also recorded in the memory as the pool information. The allocation processing program 3508 refers to this management table and manages the order control processing of the page allocation for the pool volumes.

This program includes a software counter and manages to which pool volumes pages have been allocated so far. As the counter is incremented each time a page is allocated, the pool volume as the target of the current page allocation can be ascertained by the position of the counter. FIG. 19 shows that the counter is at the pool volume #1 (free queue #1).

Figure 20:
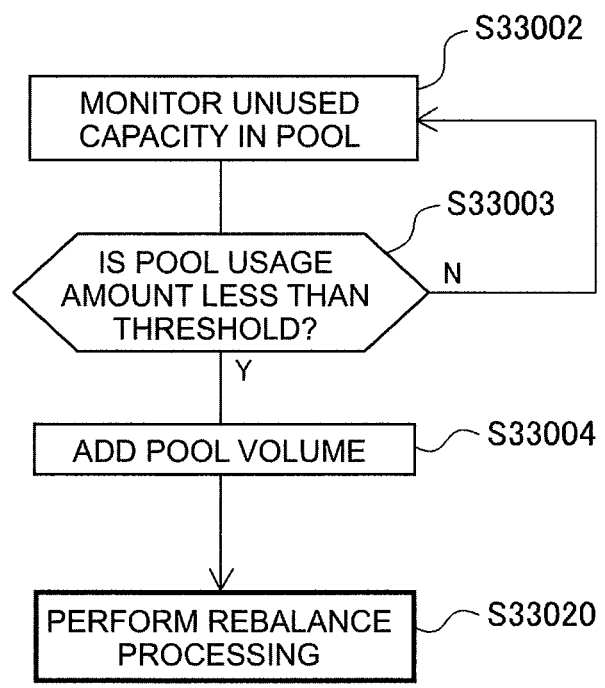
FIG. 20 is a flowchart showing that the storage apparatus performs the rebalance processing when adding pool volumes to the pool.

The rebalance processing program 3509 of the storage apparatus, as shown in FIG. 20, with page relocation being the triggers for performing, detects the addition of pool volumes to the pool.

In FIG. 20, the rebalance processing program 3509 in the storage apparatus monitors the unused capacity of the pool for a certain period of time (S33001, S3302), and determines whether the total usage amount of the pool (the capacity of all the pages used for allocation) has exceeded the threshold or not (S33003).

If the usage amount exceeds the threshold, the management device 20 or the maintenance computer performs the processing for newly adding pool volumes to the pool. The storage apparatus updates the management information shown in FIGS. 5 to 7 in accordance with the addition of pool volumes (S33004). After that, the processing shifts to the rebalance (S33020).

The details of the rebalance processing are described below with reference to FIG. 21. The rebalance processing program determines the possibility of rebalancing the pool which is the target of the rebalance (S7010A). This determination is performed by, for example, referring to the pool information 352 in FIG. 3.

An example of the cases in which rebalance is determined to be impossible for the pool as the target of rebalance is described below.
Pool status:
  Pool is blocked
  The number of volumes in the pool is equal to or larger than the specified value (8)
Pool volume status:
  Being formatted
  In process of degenerate
  Blocked
Virtual volume:
  Blocked
Rebalance is also determined to be impossible due to a failure in hardware resources in the storage apparatus (the processor, the shared memory, the cache memory, and the PDEVs), depending on the level of the failure.

Furthermore, if the rebalance OFF flag is set for the pool as the rebalance target, the processor determines rebalance is impossible to perform. The rebalance ON/OFF setting information can be set in units of pools or in units of virtual volumes.

If the rebalance is determined to be possible, the rebalance processing program performs the preprocessing (S7010), for example, determines the pool volumes as the source and as the destination of page migration (changing the page allocation or migration), determines the order of selecting the pool volumes for which the page migration processing is performed, and simulates the capacity of the pool volumes after the page migration, etc.

Next, the rebalance processing program calculates the number of pages to be migrated in the pool (S7011), and then performs the page migration processing (S7012). At this point of migration, as described later, the fixed pattern existing in the multiple pool volumes (e.g., the page whose data is all "0") is discarded, and the processing for reducing the pool volume capacity is performed at the same time.

In page migration, the rebalance processing program determines whether there are any conditions for suspending the rebalance processing or not. For example, if there is any I/O to the page as a rebalance target from the host computer, the rebalance is suspended. The rebalance processing may be resumed after the cause of suspending the rebalance is removed.

Next, the rebalance processing program manages the progress of the page migration (S7013). By this management, the rebalance processing program can disclose the progress of the rebalance to the user.

Figure 21:
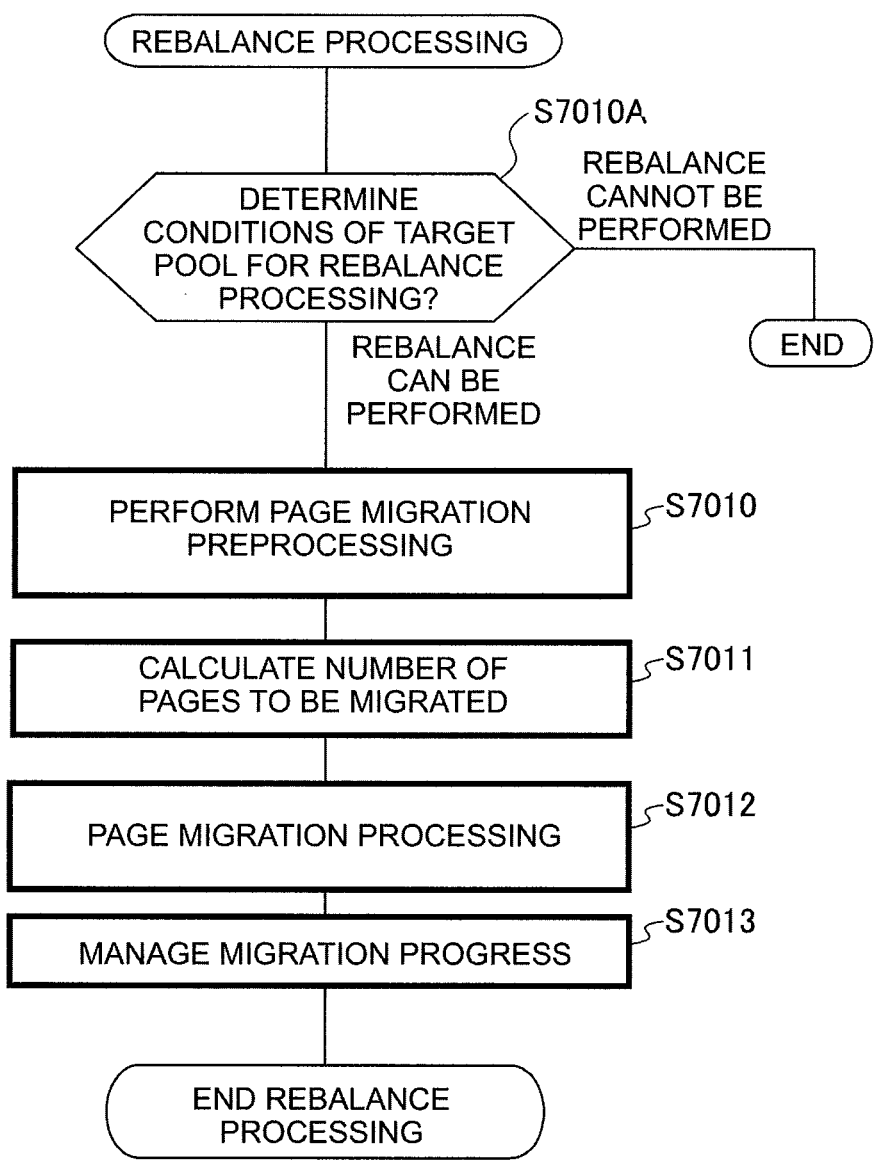
FIG. 21 is a flowchart showing the rebalance processing.
Figure 22:
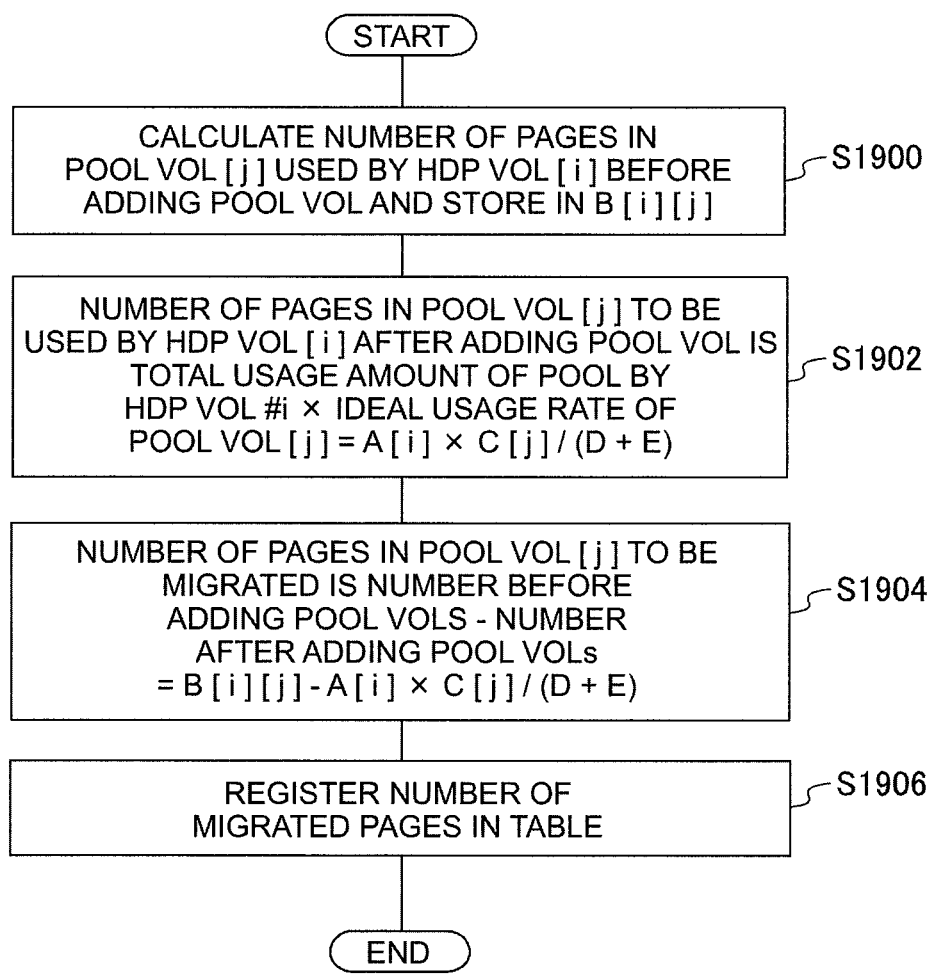
FIG. 22 is a flowchart showing the processing of calculating the number of pages migrated among multiple pool volumes.

FIG. 22 is a flowchart showing the details of calculating the number of pages to be migrated in FIG. 21 (S7011). The method of calculating the number of pages at this point is specifying the number of pages balanced among the multiple pool volumes as the ideal number of pages and making up the difference between this number and the number of the currently used pages. The rebalance processing program searches the usage amount of pages in each pool volume which is allocated to an HDP VOL (virtual volume).

The description of FIG. 22 assumes the following items.
The total usage amount of the pool by the HDP VOL #i (the total number of pages allocated to (used by) all the volumes belonging to the pool): A [i]
The total usage amount of the pool volume #j by the HDP VOL #i: B [i] [j]
The capacity of the pool volume #j (total number of pages): C [j]
The capacity of the entire pool (total number of pages): D
The capacity of all the added pool volumes (total number of pages): E Firstly, the rebalance processing program calculates the number of pages in the pool volume [j] allocated to the HDP VOL [i] before adding pool volumes, and stores it in B [i] [j] (S1900). B [i] [j] is set as the work area of the memory 350.

Next, the rebalance processing program calculates the number of pages in the pool volume [j] to be used by the HDP VOL [i] after adding pool volumes to the pool by the method described below (S1902).

Total usage amount of pool by HDP VOL #i×Ideal usage rate of pool volume $$[j] = A[i] \times C[j]/(D+E)$$

The ideal usage rate of the pool volume is the rate of the pages allocated to the pool volumes to the total number of pages that can be stored in the pool volume, and is the value assuming that the pages are equally allocated among multiple pool volumes.

The number of pages involving migration for the pool volume [j] is the difference between before and after adding pool volumes as described below (S1904).

$$\text{Number of pages} = B[i][j] - A[i] \times C[j]/(D+E)$$

If the above-mentioned calculated value is a positive value (+), the pool volume [j] is a migration source volume and, if the calculated value is a negative value (−), the pool volume [j] is a migration destination volume.

After calculating the number of migrated pages, the rebalance processing program, for each pool number, registers the number of migrated pages and whether the pool volume is the migration source or the migration destination in an exclusive table (S1906).

FIG. 23 is a block diagram showing the number of pages calculated by the processing of FIG. 22 and the process of page migration. The page migration is based on the result of calculating page migration of each virtual volume, in the multiple pool volumes belonging to a storage pool group and in the multiple virtual volumes corresponding with them. The numeric values in the symbols of pool volumes show the number of pages to be used for allocation in the pool volumes.

As shown in FIG. 23, as for the virtual volume #0, no page migration is performed among multiple pool volumes. As for the virtual volumes #1 and #2, in the direction of the arrows shown in FIG. 23, the pages of the number shown above the arrows are migrated. The rebalance processing program performs page migration in units of pools. That is, all the page migration shown in FIG. 23 is performed. Note that the page migration in units of virtual volumes may also be permitted. For example, it is possible to perform page migration among multiple pool volumes for the virtual volume #1 and not to perform page migration for the virtual volume #2.

FIG. 24 is a management table for achieving the page migration embodiment shown in FIG. 23. This management table is stored in the specified area of the memory 350. The management table exists in each virtual volume and is created with reference to the processing of the step S1906 in FIG. 22. Whether each pool volume is the migration source or the migration destination is registered for each virtual volume, and the number of pages migrated from the pool volume as the migration source to the pool volume as the migration destination is registered in the pool volumes as the migration source and the migration destination respectively.

The rebalance processing program creates and registers this table by the processing of S7011 (FIG. 21), refers to this table at S7012, and performs migration.

Figure 25:
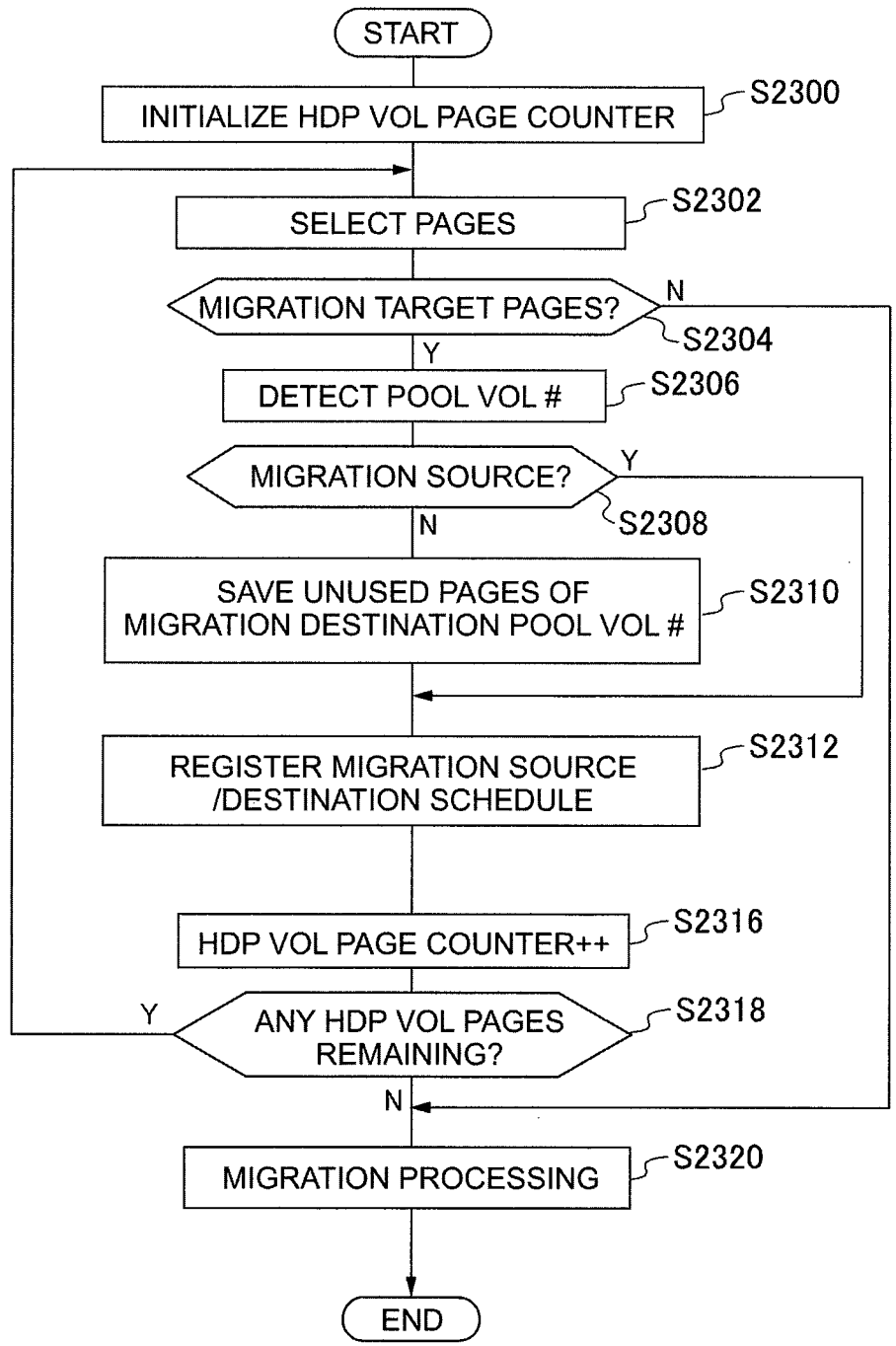
FIG. 25 is a flowchart showing the details of the migration processing.

FIG. 25 is a flowchart showing the details of the migration processing in FIG. 21 (S7012). This processing is, if there are multiple virtual volumes, performed for each of the virtual volumes.

The rebalance processing program detects the related pages from the virtual volume. Though the migration target is the pages of the pool volume, by referring to the address management table 3511, the related pages corresponding with the pages as the migration target can be identified from all the pages in the virtual volume.

The rebalance processing program determines whether each of all the pages from the head page in the virtual volume is a related page or not. The software counter is used for managing to which pages the check has been done so far. As the page check progresses, the counter is incremented. Therefore, the rebalance processing program performs the counter initialization (S2300).

Next, the rebalance processing program selects the pages in the virtual volumes from the head pages (S2302). Next, whether the pages as the migration target of the pool volume are allocated to the selected pages or not is determined (S2304).

The rebalance processing program, if affirming the determination, detects the identification information of the pool volume to which the pages as the migration target belong with reference to the address management table 3511 (S2306).

Next, with reference to the tables in FIG. 24, whether the pool volumes are the migration source or the migration destination is determined (S2308). The rebalance processing program, if the pool volumes are the migration destination, saves unused areas for migrating pages from the migration source pool volume in the migration destination pool volume (S2310).

For the pool volume to which the pages are migrated, the one with the low allocation balance is selected but, if multiple pool volumes compete as the migration destinations, the added pool volumes are selected first, and then the pool volumes with the higher priority to be the migration destinations are sequentially selected. In the migration destination priority table, the priority of each pool volume to be the migration destination is registered.

The rebalance processing program, after determining the migration destination pool volume, the migration source pool volume, and the number of migration target pages, determines the page migration schedule, and registers it in a migration execution job of the memory 350 (S2312).

This schedule is, involving the migration of multiple pages for example, for determining the order of performing the page migration. This schedule is updated and registered each time pages are selected sequentially at S2302 and each time a new migration destination volume or others are determined.

Next, the rebalance processing program increments the count value of the counter (S2316), and determines whether any pages not selected at S2302 still exist or not (S2318). If any pages not considered yet still exist, the processing returns to the step S2302, and further, if there is no page, the migration is performed in accordance with the schedule sequentially updated at S2312 (S2320). Note that the migration processing (S2320) may also be performed after S2312.

Figure 26:
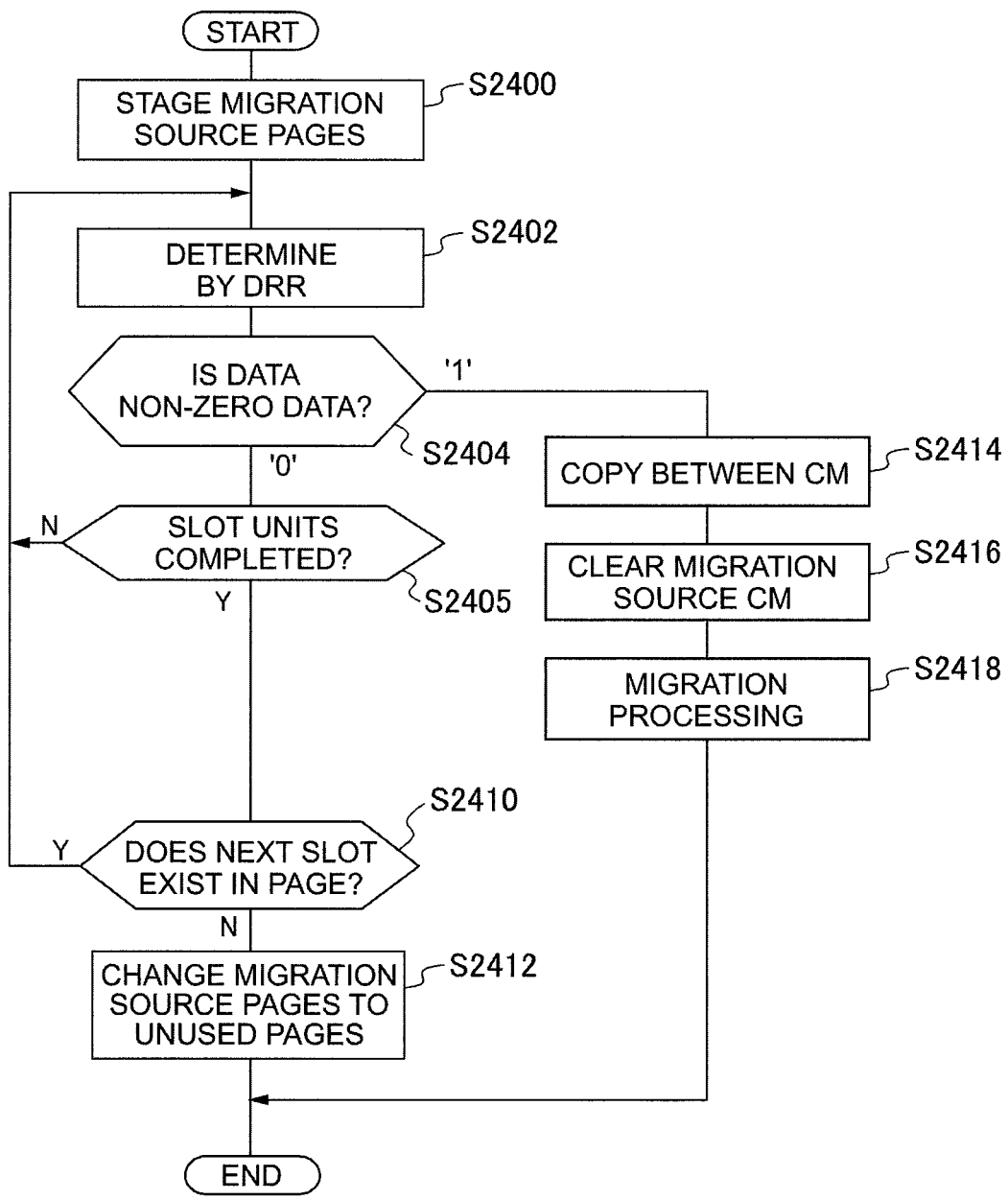
FIG. 26 is a flowchart showing further details of the migration processing.

FIG. 26 shows the migration processing in FIG. 25 (S2320). The storage adapter 370, in accordance with the rebalance processing program, stages all the data in the migration source page from the migration source pool volume to the cache memory 32 in units of slots (S2400).

Figure 27:
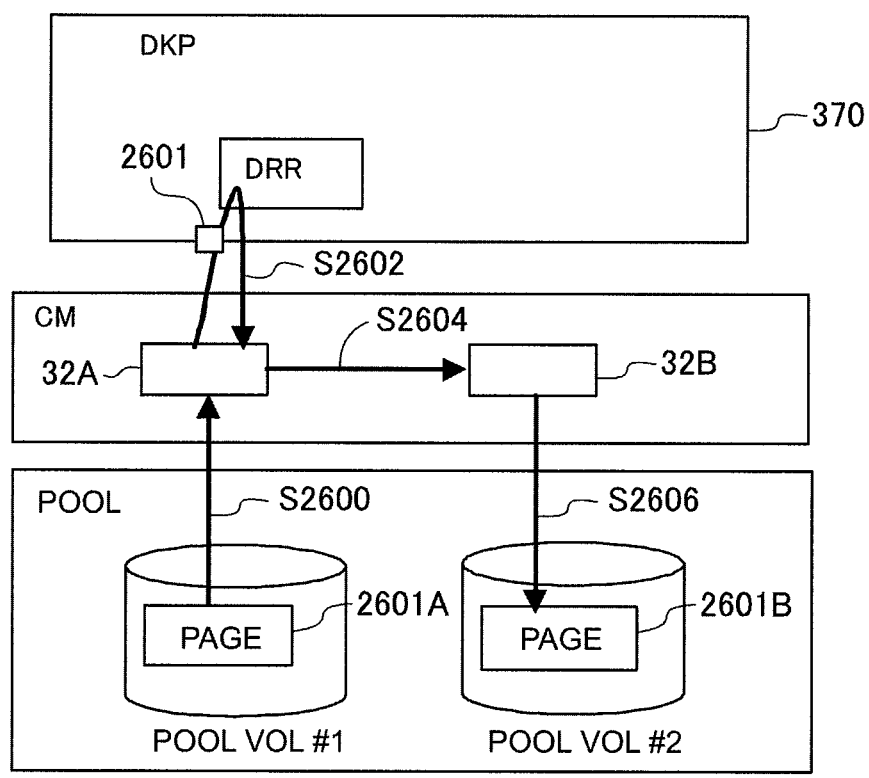
FIG. 27 is a block diagram of a cache memory performing the migration processing.

FIG. 27 shows the above-mentioned process. The pool volume #1 is the migration source, and the pool volume #2 is the migration destination. S2600 shows the process of the migration source page being staged to a first area 32A of the cache memory. The reference sign 2601 is a slot. Staging is performed in units of slots. The reference sign 2601A is a migration source page, and the reference sign 2601B is a migration destination page.

The DRR circuit in the storage adapter 370 (Data Recover and Reconstruct circuit) checks the data in the migration source page 2601A in units of slots and checks whether the data is "0" or not (FIG. 26: S2402-S2404, FIG. 27: S2602).

This determination is performed for determining whether the data of the migration source page is one of the fixed patterns (all data is "0") or not. If data is a fixed pattern, page migration is not performed, and mapping for the migration target pages in the virtual volumes is changed to the area exclusive for storing fixed pattern data.

If the DRR detects the existence of "1," the processing shifts to the step 2414, and the memory controller in the cache memory performs the copy between cache memories of the data in the migration source pages from the first area 32A to a second area 32B (FIG. 26: S2414, FIG. 27: S2604). Then, the storage adapter 370 clears the migration source cache memory 32A (FIG. 26: S2416).

Next, the data in the second area 32B is destaged to the migration destination page 2601B of the migration destination pool volume #2 (FIG. 27: S2606), the migration source page 2601A is changed to an unused page, and further, the migration processing such as changing the allocation for the pages in the virtual volume from the migration source page to the migration destination page is done (FIG. 26: S2418).

When the data of the slot determined by the DRR is "0," the storage adapter 370 determines whether the check for all the data in units of slots is completed or not (S2406), and if it is determined to be negative, the processing returns to the step S2402, and checks whether the other data in the same slot is "0" or not. When the check for all the data in the slots is completed, the processing shifts to the step S2410, checks whether there are slots remaining in the migration source page or not and, if it is determined to be positive, performs the above-mentioned check for the next slot.

When the determination for all the slots affiliated to the page is completed, the processing shifts to the step S2412 and, as for the migration source page whose data is all "0," the migration is determined to be unnecessary and is changed to an unused page.

If the storage apparatus performs the processing shown in FIG. 26, when relocating pages, the pages with the fixed pattern data are released from the already used management information, which prevents the duplicated allocation of the fixed pattern data to the virtual volume, and consequently, enables the host device to efficiently utilize the storage areas in the pool volume.

In the process of migration described in FIG. 26, if I/O from the host computer or copy I/O in the storage apparatus is issued for the migration source page, the storage apparatus gives priority to the I/O processing and suspends the page migration.

Figure 28:
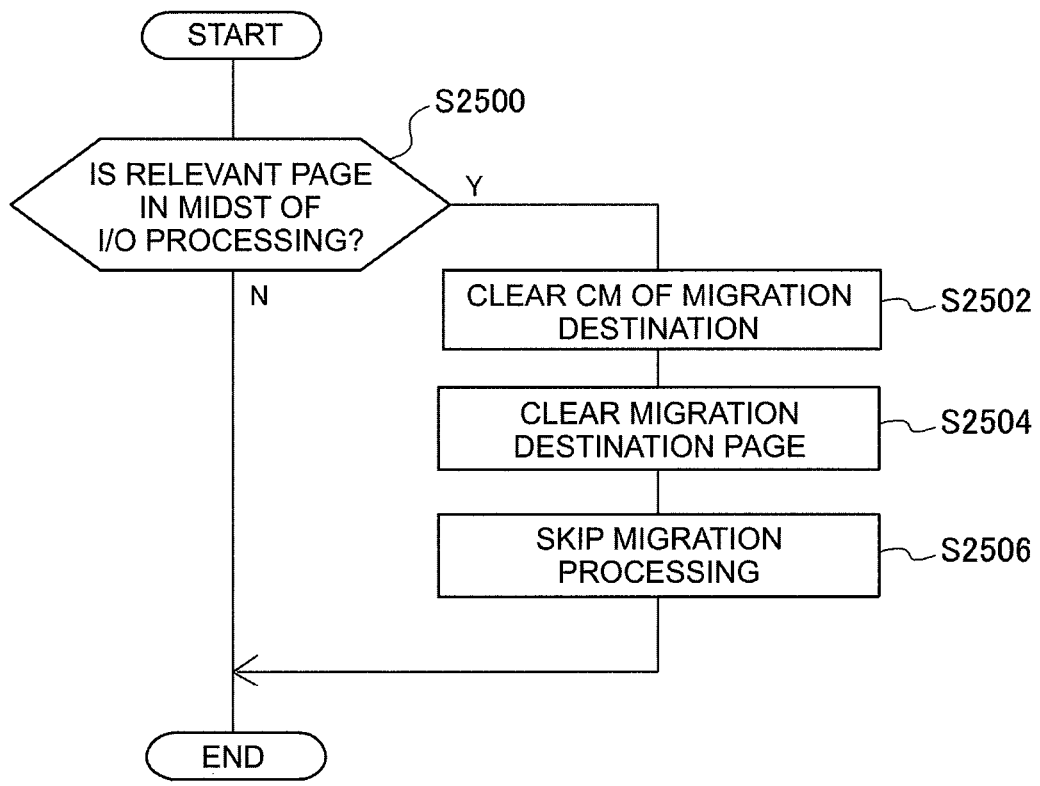
FIG. 28 is a flowchart showing that the I/O processing from the host device is prioritized over page migration.

That is, as shown in FIG. 28, if read or write I/O is provided to the virtual volume, the processor checks whether the logical address to the migration source page is included or not (S2500).

As the fact that the logical address to the migration source page is included means that the path between the virtual volume and the migration source page is not disconnected and that the page migration processing is not completed, the processor clears the data in the second area of the cache memory (32B in FIG. 27) where the data of the migration source page is stored (S2502), and further, performs the clearing processing for the migration destination page (S2504).

The clearing processing described here means, if the mapping is for the virtual volume, the deletion of the mapping management information and, if the migration destination page is managed as the used page, means the deletion of the management information.

Next, the processor, at S2506, skips (completes) the migration processing in FIG. 26. Note that, as for read I/O, it may also be permitted to suspend the migration processing until this processing is completed and then to resume it.

As described in FIG. 27, the cache memory 32 includes the first area (cache area for the migration source) 32A and the second area (cache area for the migration destination) 32B and, as the data in the migration source page of the second area is not copied to the migration destination page 2601B until there is no difference between them, the page migration processing can be suspended when I/O reaches the migration source page.

In the free queue structure shown in FIG. 11, the unused page information (PSCB) of multiple pool volumes was connected to one free queue. By this method, when allocating pages to a virtual volume, the processor could not recognize of whose pool volume the unused pages were to be allocated to the virtual volume.

In the rebalance processing, as allocated pages are migrated from the pool volumes with the higher rate of allocated pages to the pool volumes with the lower rate, it is necessary to recognize to which pool volume the migration destination pages belong. Therefore, the processor must change the free queue structure to a structure in which one pool volume is allocated to one free queue.

Figure 29:
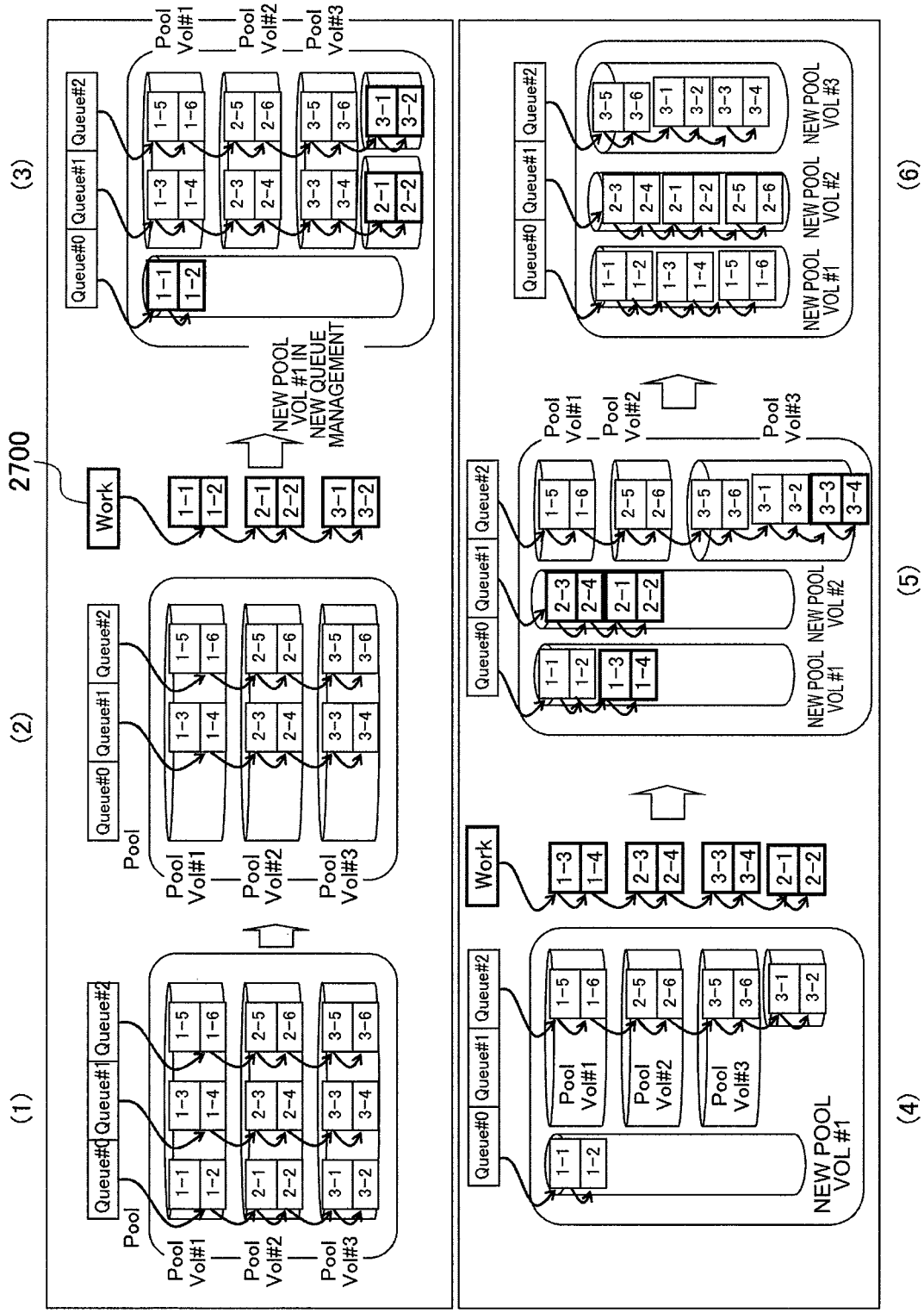
FIG. 29 is a block diagram showing the process of queue structure reconfiguration.

FIG. 29 is a block diagram showing the process in which the queue structure is changed. The processor releases the information of the unused areas connected to the free queue #0 from the free queue #0 and connects it to the work queue 2700 #1 ((1)→(2)). The processor configures the free queues for making the correspondence of the free queue #0 with the pool volume #1 ((3)), releases the information of the free areas (1-1, 1-2) belonging to the pool volume #1 from the work queue #1, and connects it to the free queue #0 ((3)).

Figure 30:
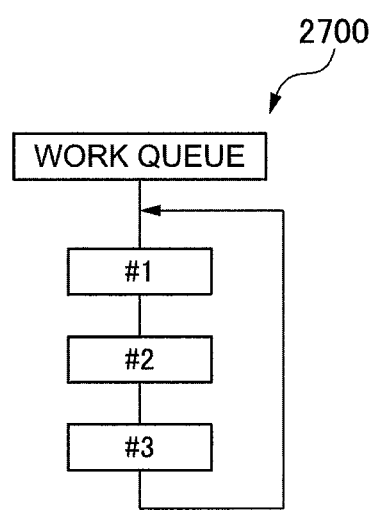
FIG. 30 is a block diagram of the structure of a work queue.

FIG. 30 shows the structure of a work queue. By releasing the link of the information of the unused pages connected to the free queue from the free queue and connecting it to the work queue, no I/O from the host computer is allowed to be provided to the free queue while reconfiguring the queue structure.

Next, the processor releases the information of the unused pages from the free queue #1, and connects it to the work queue #2 ((4)). The processor makes the correspondence of the free queue #1 with the pool volume #2, then releases the unused areas (1-3, 1-4) affiliated to the pool volume #1 from the work queue #2, and connects them to the free queue #0 ((4)→(5)).

Next, the processor releases the information of the unused pages from the free queue #2, and connects it to the work queue #3. The processor makes the correspondence of the free queue #2 with the pool volume #3, then releases the unused areas (1-5, 1-6) affiliated to the pool volume #1 from the work queue #3, and connects them to the free queue #0.

As a result of the above-mentioned processing, the free queue #0 is allocated to the pool volume #1, and to the pool volume #1, the information of the unused pages all from the pool volume #1 (1-1 to 1-6) are connected.

Furthermore, the processor releases the information of the unused pages in the pool volume #2 connected to the head of the work queue #1 from the work queue #1, and connects it to the pool volume #2. The same processing is performed for the work queue #2 and then for the work queue #3. As a result of this processing, the information of the unused pages in the pool volume #2 is connected to the free queue #1 allocated to the pool volume #2.

Furthermore, the processor releases the information of the unused pages in the pool volume #3 connected to the head of the work queue #1 from the work queue #1, and connects it to the pool volume #3. The same processing is performed for the work queue #2 and then for the work queue #3. As a result of this processing, the information of the unused pages in the pool volume #3 is connected to the free queue #2 allocated to the pool volume #3.

Figure 31:
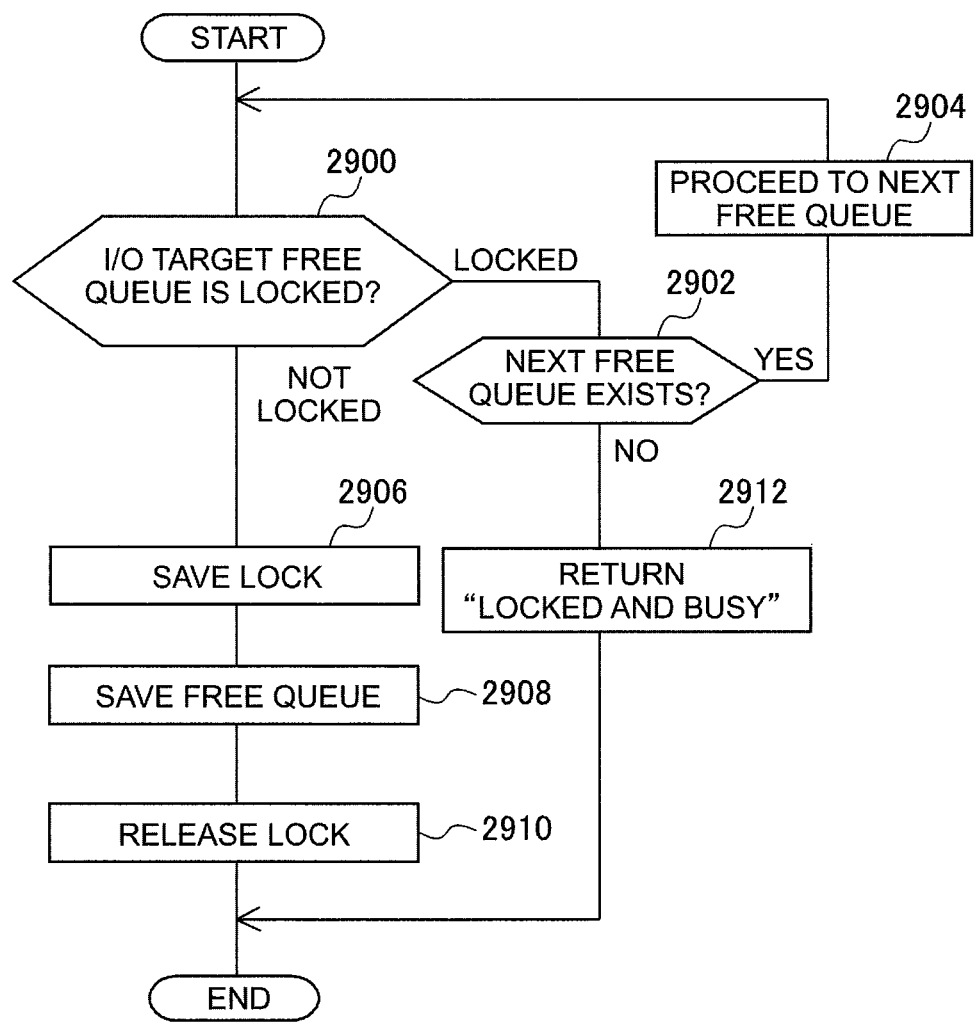
FIG. 31 is a first flowchart showing queue structure reconfiguration.

FIG. 31 is a flowchart for converting the free queue structure. For converting the queue structure, when a host I/O is requested for a free queue, the processor locks the free queue and makes the queue structure conversion wait until the I/O processing is completed.

The processor checks whether the free queue as the I/O target is locked or not (2900). If it is determined to be locked, the processor determines whether there is a next free queue to be the I/O target (2902) and, if this is affirmed, refers to the next free queue (2904), and returns to the step 2900.

If the selected free queue is not locked, the processor locks it and saves the free queue (2906, 2908), allocates unused pages from the free queue to the I/O, and then releases the lock of the free queue (2910).

If there is no next free queue at the step 2902, the processor reports to the host I/O that the target free queue is locked and busy (2912).

Figure 32:
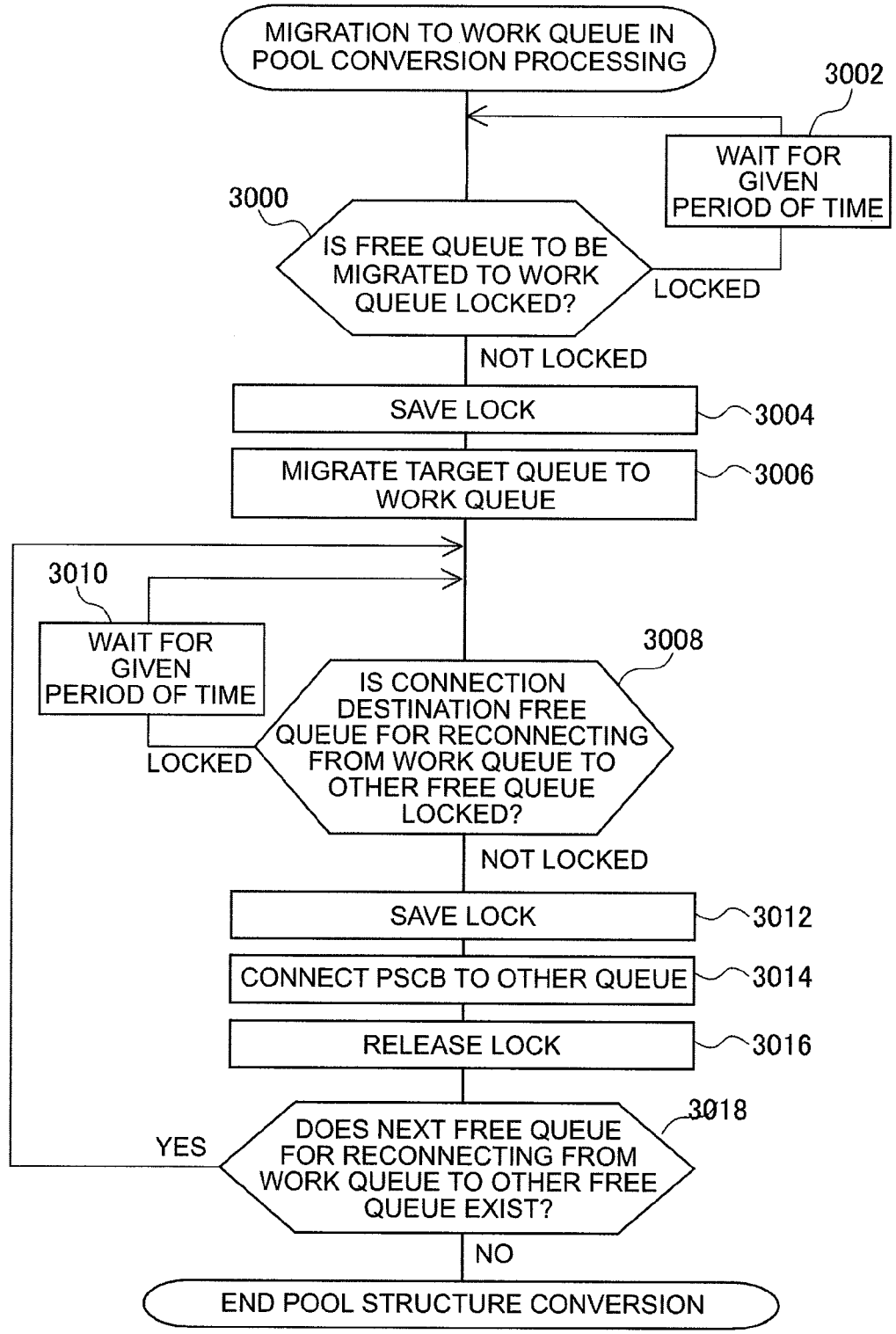
FIG. 32 is a second flowchart showing queue structure reconfiguration.

FIG. 32 is a flowchart for performing the conversion of the queue structure. The processor checks whether the free queue as the target of migration to the work queue is locked or not and, if it is locked, repeats the processing at the step 3000 until the I/O processing for the free queue is completed (3002).

If the target free queue is not locked, the processor locks the target free queue (3004), and connects it to the work queue (3006). Next, for reconnecting the unused page information from the work queue to another free queue, the processor checks whether the connection destination free queue is locked or not (3008) and, if it is locked, waits until the I/O processing for the connection destination free queue is completed (3010).

If the target free queue is not locked, the processor locks the connection destination free queue (3012) to this, connects the unused page information (PSCB) released from the work queue (3014), and releases the lock of the target queue and the connection destination queue (3016).

Next, the processor determines whether there is a next connection destination queue to be reconnected from the work queue to another free queue (3018) and, if this is affirmed, returns to the step 3008 or, if this is not affirmed, completes the queue structure conversion processing.

Figure 33:
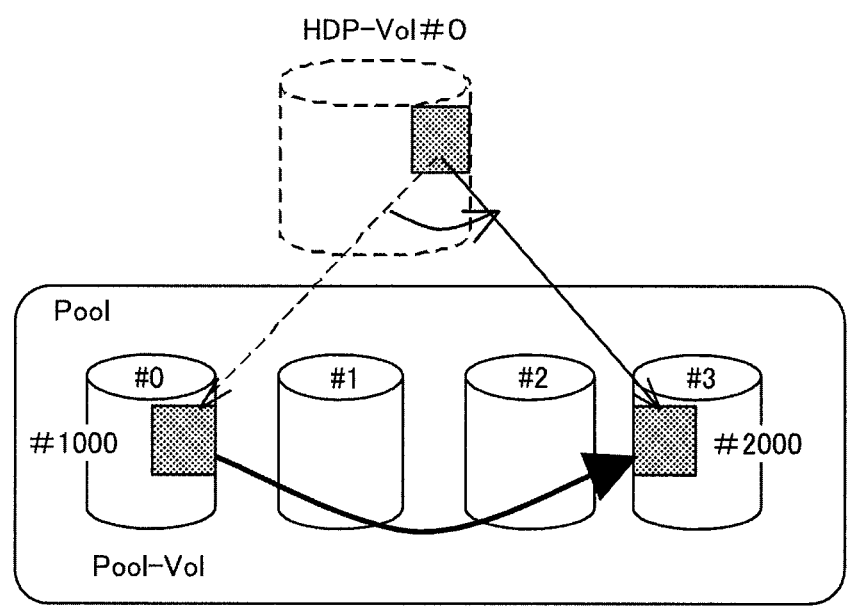
FIG. 33 is a block diagram showing the process of page migration among multiple pool volumes and is the precondition for FIG. 34.
Figure 34:
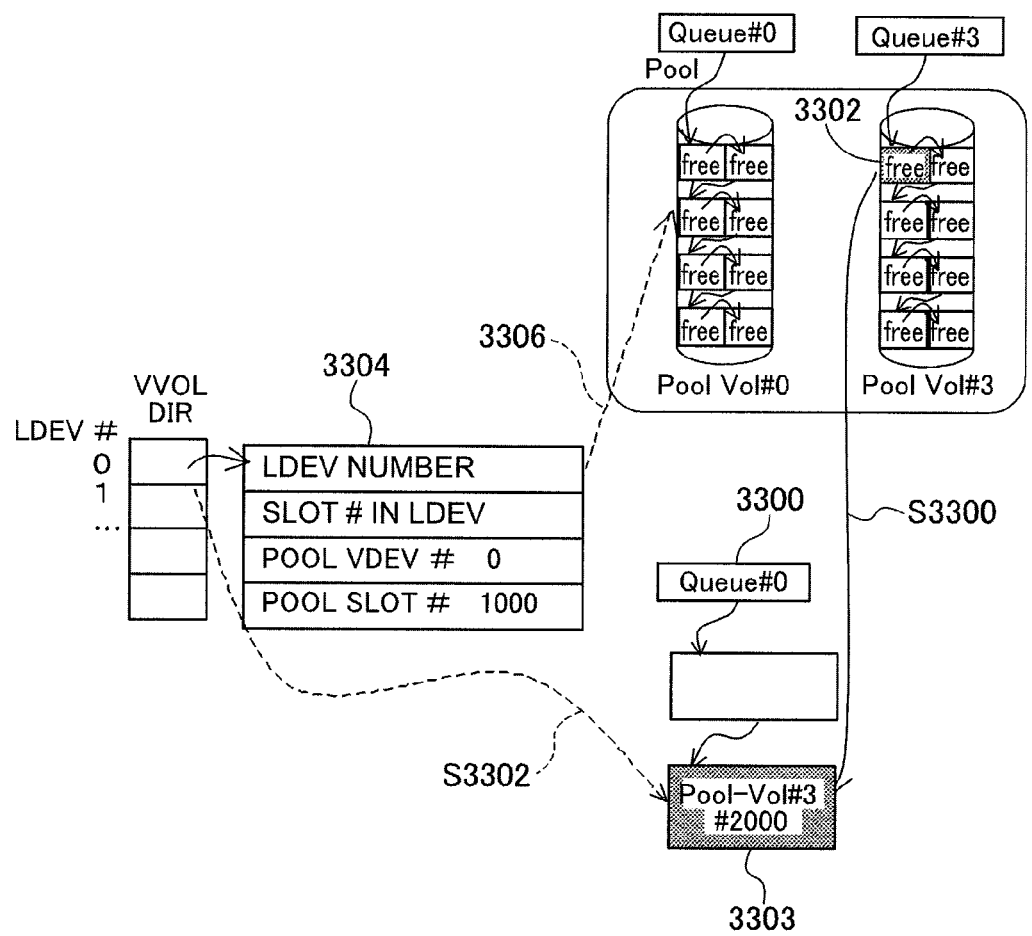
FIG. 34 is a block diagram showing the free queue processing for achieving the page migration.

Next, the page migration processing of S2418 in FIG. 26 is described related to the free queues. This description assumes the migration shown in FIG. 33. That is, the process in which the data of the page #1000 in the pool volume #0 is copied to the page #2000 in the pool volume #3 and the mapping to the former page in the virtual volume (HDP-Vol #0) is changed to the mapping to the latter page is described with reference to FIG. 34.

The rebalance processing program 3509 saves an in-migration queue, connects it to the free queue #3, then, from the free areas connected to the free queue #3 allocated to the pool volume #3, selects the target area 3302 to be the migration destination page, and connects this pointer information (Pool-Vol #3, #2000) 3303 to the end of the in-migration queue (queue #0) 3300 (S3300). The area to be the migration destination page is managed by a different queue from the free queue for preventing the area to be the migration destination page from being allocated to the virtual volume.

When the rebalance processing program receives the report that the page data migration was normally completed from the copy job, the pointer information 3304 which is the information of the mapping 3306 for the page in the VVOL DIR (pool volume #0, page #1000) is cleared, changed to the pointer information for the address of the migration destination page (Pool-Vol #3, #2000) (S3302), and inserts the address of the migration source page in the appropriate position in the queue structure of the free queue #. Furthermore, the migration destination page is released from the in-migration queue.

Figure 35:
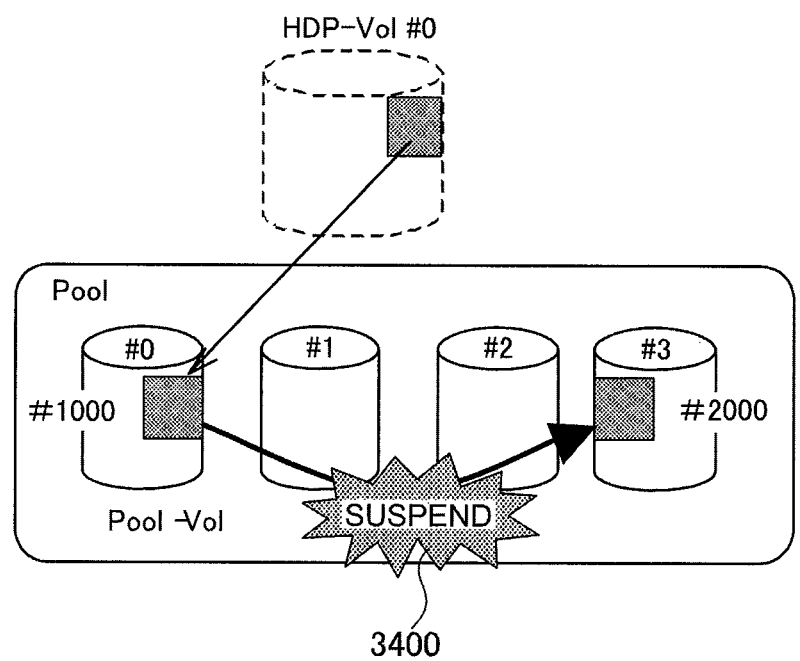
FIG. 35 is a block diagram as the precondition for FIG. 36.
Figure 36:
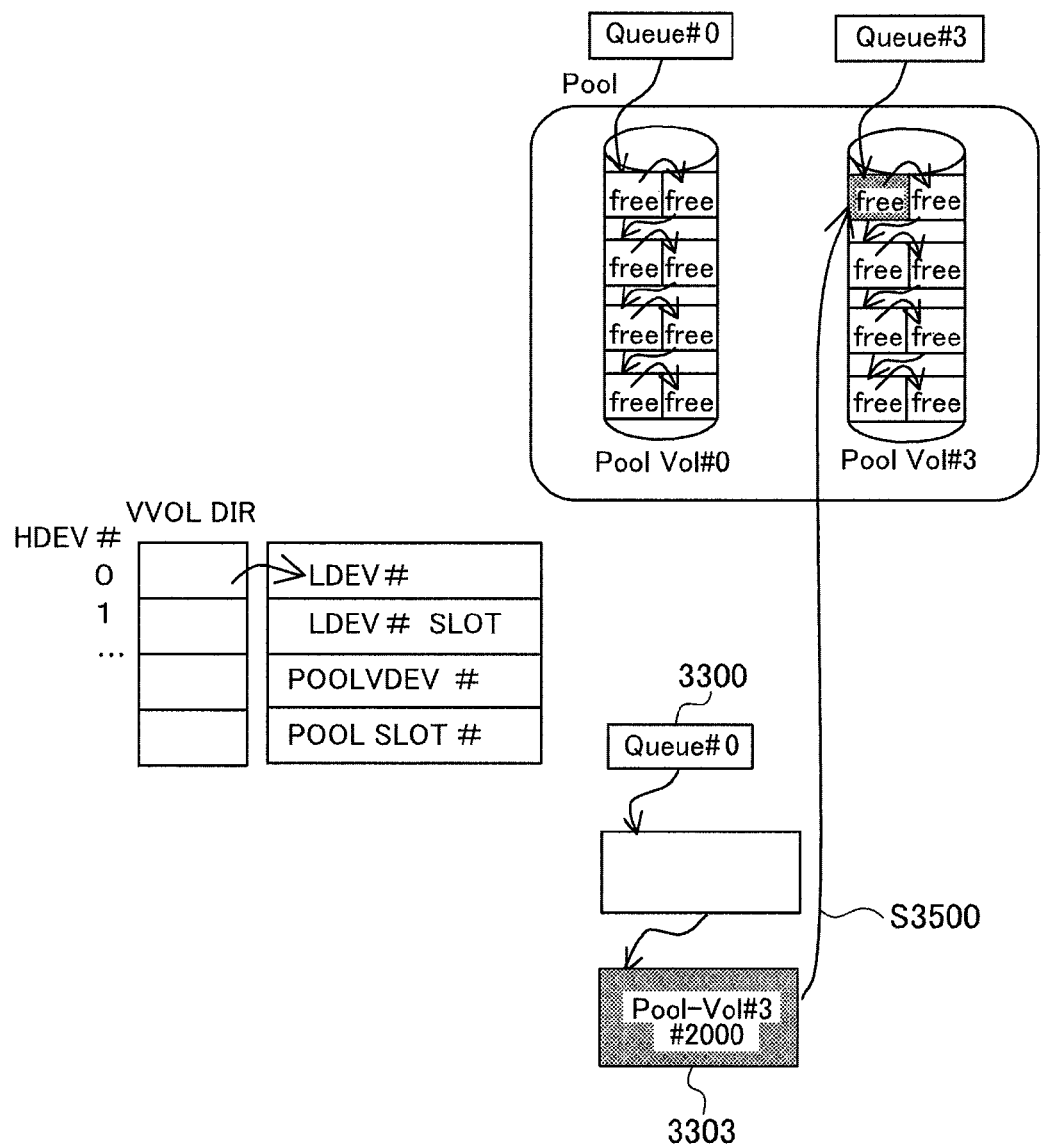
FIG. 36 is a block diagram showing the free queue processing in the case that the migration is suspended.

As shown in FIG. 35, if the process of the data migration from the migration source page to the migration destination page is suspended (3400) due to I/O from the host device or other causes, as shown in FIG. 36, the rebalance processing program saves an in-migration queue, clears the pointer information 3304 set for the migration destination queue, and returns it to the information before the change.

Furthermore, the program saves the free queue #3 of the pool volume where the migration destination page 3303 originally existed and, for this free queue, searches for the position for inserting the migration destination page 3303 as a free area.

The rebalance processing program connects the in-migration queue 3300 to the free queue (Queue #3), releases the migration destination page 3303 from the in-migration queue 3300, and further, connects the migration destination page to the free queue (Queue #3).

As mentioned above, the storage apparatus, by utilizing an in-migration queue which is a different queue from a free queue, can achieve the page relocation as well as, even if the factors such as host I/O competing with the page relocation are added to the storage apparatus, give priority to the I/O processing.

FIGS. 37A to 37F are screens for managing the progress of migration and provided to the management user. The page migration progress status is displayed with reference to the result of the above-mentioned calculation of migrated pages.

FIGS. 37A to 37F are screens in which the page usage status before migration is aggregated in units of pool volumes. FIG. 37A shows the status before the page migration and FIG. 37F shows the status after the page migration. The numerals in the figures show the number of pages.

FIG. 38A is a screen in which the number of pages before the migration is aggregated in units of virtual volumes. FIG. 38B is a screen in which the number of pages after the migration is aggregated in units of virtual volumes.

Therefore, for the administrative user, the migration progress status is displayed via the management screen.

In the above-mentioned embodiment, the determination of the page rebalance trigger and the possibility of performing rebalance is performed by the storage apparatus, but this can be performed by the management device. In the former case, the storage apparatus is the computer system of this invention and, in the latter case, the combination of the management device and the storage apparatus is the computer system.

Furthermore, though the above-mentioned embodiment describes that the number of migrated pages are calculated at the time of migration, it may also be permitted for the administrative user to input the number of migrated pages.

What is claimed is:

1. A computer system, comprising:
  a storage device including a plurality of storage areas;
  a virtual volume including a plurality of virtual logical areas;
  a plurality of pool volumes including the plurality of storage areas managed as a plurality of segments; and
  a controller configured to:
    manage the plurality of pool volumes as a group that relates to the virtual volume;
    allocate the plurality of storage areas of the plurality of pool volumes in the group to the virtual volume in segment units, when the virtual volume receives a write request to store data indicated by the write request, where an order of the allocation of the plurality of storage areas is determined based on a storage capacity ratio of the plurality of pool volumes in the croup, and store the data indicated by the write request; and
    when a new pool volume is added to the group, migrate data, in a part of the plurality of allocated storage areas, to a plurality of new storage areas in the new pool volume, and allocate the plurality of new storage areas to the virtual volume in segment units, based on a capacity of each of the plurality of pool volumes in the group and a number of segments in each of the plurality of pool volumes that are allocated to the virtual volume.

2. The computer system according to claim 1, wherein the controller is further configured to:
change the allocation of the plurality of allocated storage areas among the plurality of pool volumes in the group in segment units so that the allocated storage capacity ratios of the plurality of pool volumes are balanced.

3. The computer system according to claim 2, further comprising:
at least one other storage device having a plurality of storage areas,
wherein the controller is further configured to:
release an allocation of one or more segments of a first storage area to the virtual volume, the first storage area being included in a first pool volume that has a higher allocated storage capacity ratio among the plurality of pool volumes including the storage areas provided by the storage device and the at least one other storage device; and
allocate one or more segments of a second storage area to the virtual volume, the second storage area being included in a second pool volume that has a lower allocated storage capacity ratio among the plurality of pool volumes including the storage areas provided by the storage device and the at least one other storage device.

4. The computer system according to claim 1, wherein the controller is further configured to:
suspend the allocation of segments of the plurality of new storage areas to the virtual volume, when the virtual volume is accessed.

5. The computer system according to claim 1, wherein the controller is further configured to:
connect an unallocated storage area of the plurality of storage areas to a free queue in segment units;
release the allocated storage area of the plurality of storage areas in segment units, from the free queue, upon allocating the unallocated storage area of the plurality of storage areas to the virtual volume; and
allocate the released storage area to the virtual volume in segment units.

6. The computer system according to claim 1, wherein the controller is further configured to:
not migrate data in an event of failure in a hardware component in the storage device.

7. The computer system according to claim 1, wherein the controller is further configured to:
display a progress of the migration of data by displaying a number of segments that are allocated to the virtual volume, for each of the plurality of pool volumes in the group.

* * * * *